United States Patent
Ishikawa et al.

(10) Patent No.: US 6,456,411 B1
(45) Date of Patent: Sep. 24, 2002

(54) METHOD OF SETTING SIGNAL WAVELENGTH IN OPTICAL TRANSMISSION SYSTEM

(75) Inventors: George Ishikawa; Hiroki Ooi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/256,189

(22) Filed: Feb. 24, 1999

(30) Foreign Application Priority Data

Mar. 30, 1998 (JP) .......................................... 10-084535

(51) Int. Cl.$^7$ ............................................... H04B 10/04
(52) U.S. Cl. ........................................ 359/187; 359/135
(58) Field of Search ................................ 359/161, 180, 359/181, 189, 187, 135

(56) References Cited

U.S. PATENT DOCUMENTS

| | | | |
|---|---|---|---|
| 5,877,881 A | 3/1999 | Miyauchi et al. ........... | 359/161 |
| 6,081,360 A | 6/2000 | Ishikawa et al. | |
| 6,204,949 B1 | 3/2001 | Ishikawa et al. ............. | 359/161 |
| 6,320,687 B1 | 11/2001 | Ishikawa ..................... | 359/161 |

FOREIGN PATENT DOCUMENTS

| | | | | |
|---|---|---|---|---|
| EP | 0 700 178 A2 | 3/1996 | ........... | H04B/10/18 |
| EP | 0 812 075 A1 | 12/1997 | ........... | H04B/10/18 |
| JP | 6-216467 | 8/1994 | | |
| JP | 7-327012 | 12/1995 | | |
| JP | 08-256106 | 10/1996 | | |

OTHER PUBLICATIONS

Akihide Sano et al., "Automatic dispersion equalization by mintoring extracted–clock power level in a 40–Gbits/s, 200–km transmission line", ECOC'96, TuD.3.5, Sep. 15, 1996, pp. 207–210.

Masahito Tomizawa et al., "Automatic dispersion equalization by tunable laser for installation of high–speed optical transmission system", OFC'97 Technical Digest, TuT2, Feb. 16, 1997, pp. 96–97.

Masahito Tomizawa et al., "Automatic dispersion equalization for installing high–Speed optical transmission systems", Journal of Lightwave Technology, vol. 16, No. 2, Feb. 1998.

Koichi Takiguchi, Katsunari Okamoto, "Variable Group–Delay Dispersion Equalizer Using Lattice–Form Programmable Optical Filter on Planar Lightwave Circuit", IEEE: Journal of Selected Topics in Quantum Electronics, vol. 2, No. 2, Jun. 1996, pp. 270–276.

Sergio Barcelos, Michael N. Zervas, Richard I. Laming, "Characteristics of chirped fiber gratings for dispersion compensation", OFC '96 Technical Digest, Wk 12, pp. 161–162.

M.M. Ohn, A.T. Alavie, R. Maaskant, M.G. Xu, F. Bilodeau, K.O. Hill, "Tunable fiber grating dispersion using a piezo-electric stack", OFC '97 Technical Digest, WJ3, pp. 155–156.

Shoichirou Kuwahara, et al., "Dispersion Fluctuation Supervisory Method Applied to Adaptive Dispersion Equalization", Electronic Information Communication Society, General Meeting (Japanese), B–10–152, Mar. 24, 1997.

(List continued on next page.)

*Primary Examiner*—Leslie Pascal
(74) *Attorney, Agent, or Firm*—Staas & Halsey LLP

(57) ABSTRACT

Signal wavelength in an optical transmission system is optimally set. Before operation of the system is started, the intensity of a particular frequency component is measured by a dispersion monitor while sweeping the wavelength of a tunable light source over a wide range, to determine an optimum wavelength. Once operation of the system is started, the wavelength is swept over a narrower range containing the optimum wavelength, and the optimum wavelength is updated with a wavelength determined based on the result of the sweeping.

18 Claims, 22 Drawing Sheets

OTHER PUBLICATIONS

Shoichiro Kuwahara, et al., "Adaptive dispersion equalization with the detection of dispersion fluctuation using PM–AM conversion for in–service high–speed, long–haul transmission systems", Technical Report of IEICE OCS 98–5, May 1998, pp. 25–30.

U.S. patent application Ser. No. 09/044,130, Ooi et al., filed Mar. 19, 1998.

U.S. patent application Ser. No. 08/728,865, Suga, filed Oct. 10, 1996.

(MEASURED FOUR TIMES AT EACH
WAVELENGTH TO TAKE AVERAGE ①②③④:
MEASURED VALUES, ●: AVERAGE VALUES)

METHOD OF SETTING SIGNAL WAVELENGTH IN OPTICAL TRANSMISSION SYSTEM

BACKGROUND OF THE INVENTION

1. Field of the Invention

Optical transmission systems operating at 10 Gb/s are now in the stage of practical implementation in trunk-line optical communications, but with rapid increases in recent years in the amount of information transmitted, due to ever increasing information communications as exemplified by the Internet, a further increase in communication capacity is demanded. One way to achieve this is to upgrade the transmission speed using time-division multiplexing techniques (including optical time-division multiplexing), and research and development of 40-Gb/s systems, the next generation of transmission systems succeeding the current 10-Gb/s systems, is actively underway both in Japan and abroad.

The present invention relates to a method of setting signal light at an optimum wavelength in an optical transmission system, and more particularly to a system of setting signal light at an optimum wavelength in an ultra high-speed time-division multiplexing optical transmission system so that chromatic dispersion in a transmission line, which varies from one repeater section to another and changes with time due to changes in ambient temperature and other environmental conditions, becomes minimum (zero) during system operation as well as at the start of system operation by using a tunable laser at the transmitting end.

2. Description of the Related Art

One of the factors limiting the transmission distance in a 40-Gb/s system is chromatic dispersion in a fiber-optic transmission line. Since chromatic dispersion tolerance is inversely proportional to the square of the bit rate, the chromatic dispersion tolerance, which is about 800 ps/nm at 10 Gb/s, is reduced by a factor of 16 to about 50 ps/nm at 40 Gb/s. According to the results of a transmission experiment conducted over a 50-km single-mode fiber (SMF) with zero dispersion at 1.3 $\mu$m (chromatic dispersion=18.6 ps/nm/km, total dispersion=930 ps/nm) using a 40-Gb/s optical time-division multiplexing (OTDM) system (G. Ishikawa et al., ECOC '96 ThC. 3.3), the dispersion compensation tolerance necessary to achieve a power penalty of 1 dB or less was 30 ps/nm. This means that in a 40-Gb/s system, the total dispersion in a transmission line must be very strictly controlled to within 30 ps/nm.

Furthermore, chromatic dispersion in a fiber-optic transmission line changes with time due to changes in ambient temperature, pressure, and other environmental conditions. For example, in the case of a dispersion-shifted fiber (DSF) with zero dispersion at 1.55 $\mu$m, the amount of change of dispersion over a distance of 100 km, in the presence of temperature changes between −50° C. and 100° C., is estimated at 31.5 ps/nm from the following equation.

[Amount of change of dispersion]=[Temperature dependence of zero dispersion wavelength]×[Temperature change] ×[Dispersion slope]×[Transmission distance]=0.03 (nm/° C.)×150 (° C.)×0.07 (ps/nm$^2$/km)×100 (km)=31.5 ps/nm This value is approximately equal to the dispersion tolerance of 30 ps/nm, and must be considered properly in system design. The reason is that, even if the chromatic dispersion could be set to zero for −50° C. at the start of system operation, if the temperature rose above 30° C. during system operation, the criterion of 1 dB penalty could not be satisfied.

From the above discussion, one can see that the implementation of an ultra high-speed optical transmission system at 40 Gb/s or higher rates requires the construction of an "automatic signal wavelength optimization system" which (i) sets the signal wavelength at the start of system operation so that the chromatic dispersion becomes minimum (zero), and (ii) controls the signal wavelength during system operation so that the chromatic dispersion becomes minimum by adjusting to the variation with time in the dispersion value of the transmission line. Such an automatic signal wavelength optimization system is needed not only for a transmission system that uses 1.55-$\mu$m dispersion-shifted fiber (DSF) having a low chromatic dispersion value at that wavelength, but also for a transmission system that uses 1.3-$\mu$m zero dispersion single-mode fiber (SMF) in conjunction with a dispersion compensation technique.

As a method for measuring chromatic dispersion in an optical fiber, a pulse method or a phase method has traditionally been used that involves inputting a plurality of light beams of different wavelengths into the optical fiber and measuring group-delay differences or phase differences between the output beams. However, in order to constantly measure the dispersion using these methods during system operation, a pair of chromatic dispersion measuring devices must be provided for each repeater section. Further, to measure the dispersion amount without interrupting the transmission of data signal light, measuring light of a wavelength different from that of the data signal light must be wavelength-division multiplexed. Incorporating the pulse method or phase method into an optical transmission apparatus is not practical in terms of size and cost. Furthermore, when using a wavelength different from the wavelength of signal light, since the process involves estimating the dispersion value at the signal wavelength from the measured value at the measuring light wavelength, the result may lack accuracy. Therefore, a method that can measure the chromatic dispersion value directly from the signal light is desirable.

As a method that can achieve this, the present inventor proposed, in Japanese Patent Application No. 9-224056 entitled "Method and Apparatus for Controlling Chromatic Dispersion and Method of Detecting Amount of Dispersion," a method that utilizes the total-dispersion dependence of the intensity of a 40-GHz component contained in the baseband spectrum of an NRZ signal and an OTDM signal. More specifically, the method utilizes the characteristic that when the amount of total dispersion is zero, the intensity of the 40-GHz component is minimum and the eye opening at that time is maximum. The method proposed in Japanese Patent Application No. 9-224056 uses a variable dispersion compensator to reduce the amount of total dispersion to zero. This patent application also refers to a method that reduces the amount of total dispersion to zero by varying the signal wavelength using a tunable laser, but no mention is made of a specific control method to achieve it.

SUMMARY OF THE INVENTION

Accordingly, it is an object of the present invention to provide a method of setting signal light at an optimum wavelength in an optical transmission system.

According to the present invention, there is provided a method of setting signal wavelength in an optical transmission system, comprising the steps of: sweeping the signal wavelength over a first wavelength range before operation of the optical transmission system is started; determining an optimum value the wavelength based on the result of the sweeping over the first wavelength range; after operation of the optical transmission system is started, sweeping the wavelength over a second wavelength range which is centered about the optimum value and is narrower than the first wavelength range; and updating the optimum value for the wavelength based on the result of the sweeping over the second wavelength range.

DESCRIPTION OF THE PREFERRED EMBODIMENTS

Figure 1:
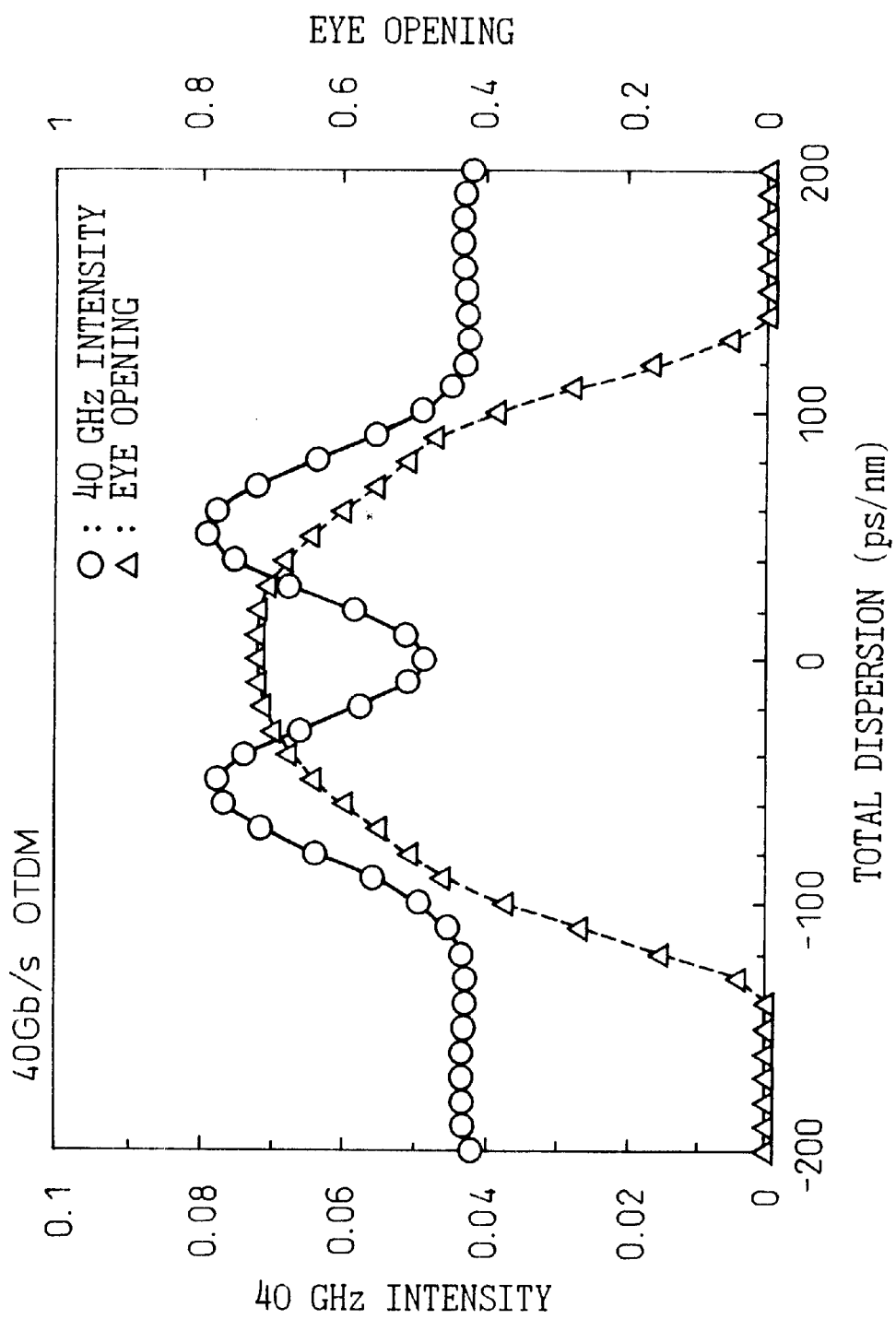
FIG. 1 is a graph showing computer simulation results on the dependence of 40-GHz clock component intensity on the amount of total dispersion for a 40-Gb/s OTDM signal.
Figure 2:
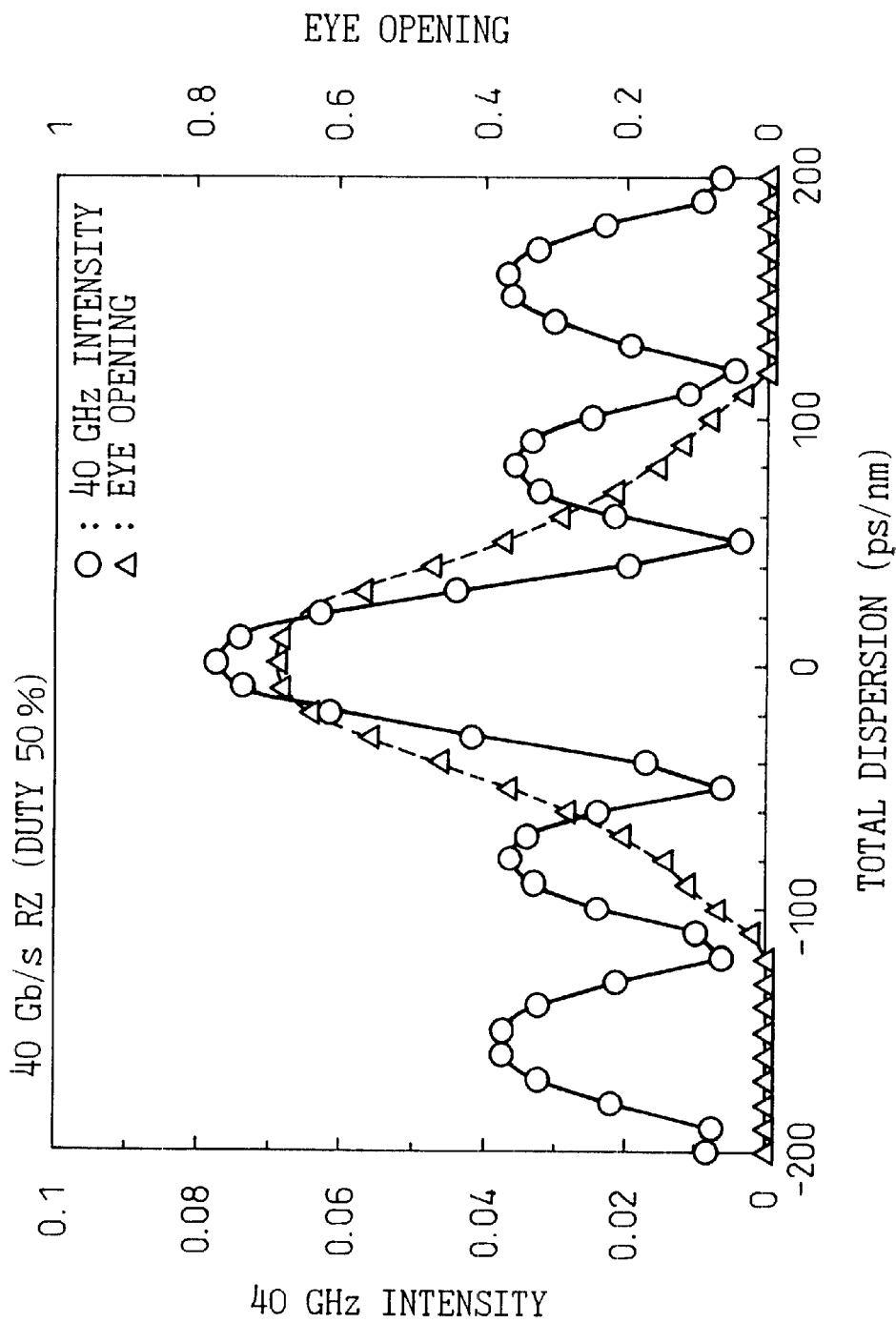
FIG. 2 is a graph showing computer simulation results on the dependence of 40-GHz clock component intensity on the amount of total dispersion for a 40-Gb/s RZ signal (50% duty)
Figure 3:
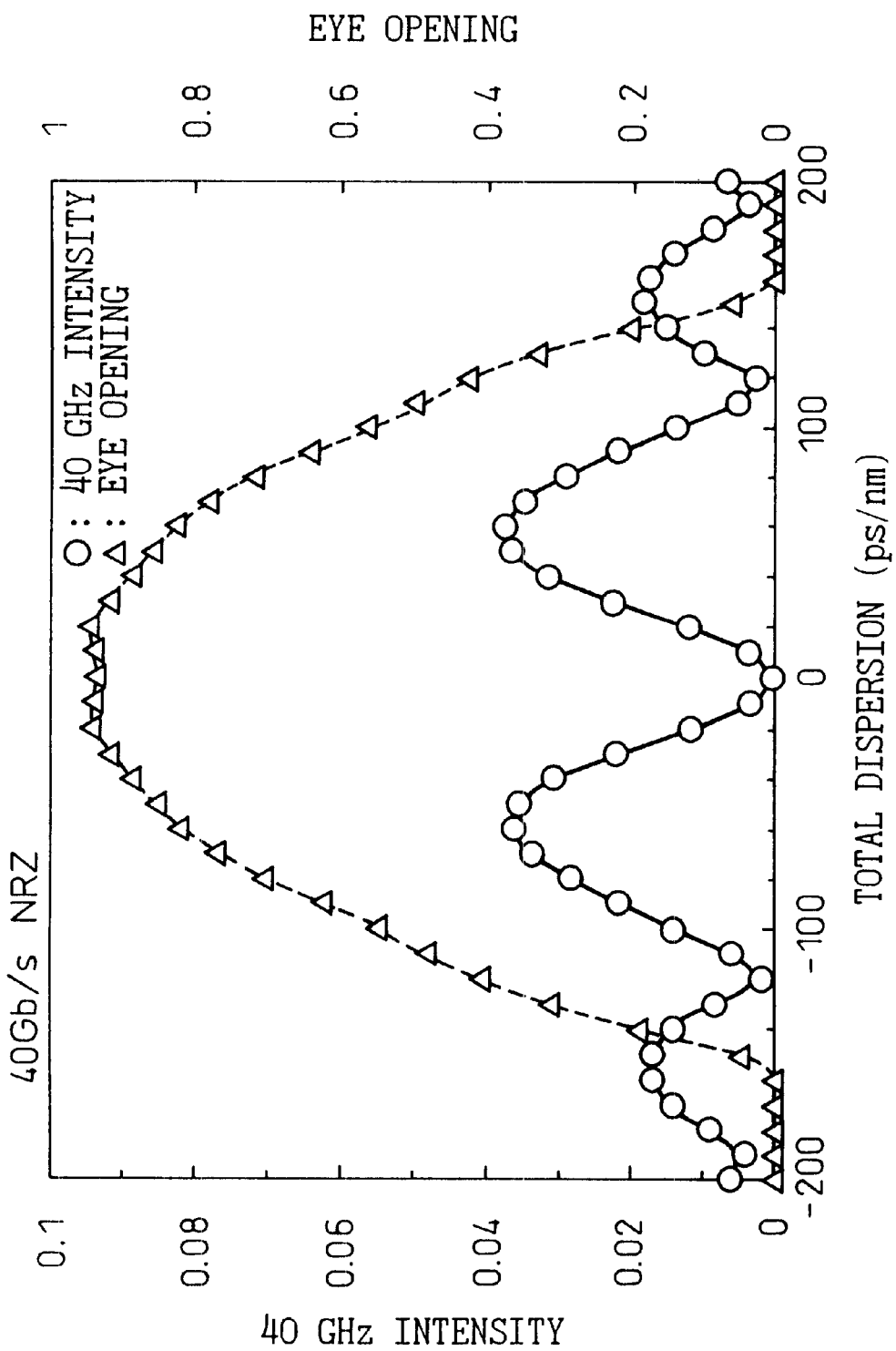
FIG. 3 is a graph showing computer simulation results on the dependence of 40-GHz clock component intensity on the amount of total dispersion for a 40-Gb/s NRZ signal.

FIGS. 1 to 3 show computer simulation results on the total-dispersion dependence of the intensity of a 40-GHz component in the baseband spectrum of an OTDM signal, an RZ optical signal, and an NRZ optical signal, respectively, each with a data signal bit rate of 40 Gb/s. Eye opening in the direction of amplitude is also shown in FIGS. 1 to 3. Input light power was −5 dBm on the average, and SMF length was 50 km; the amount of total dispersion was varied by varying the amount of dispersion in a DCF (dispersion-compensating fiber) connected in series to the SMF.

Figure 4:
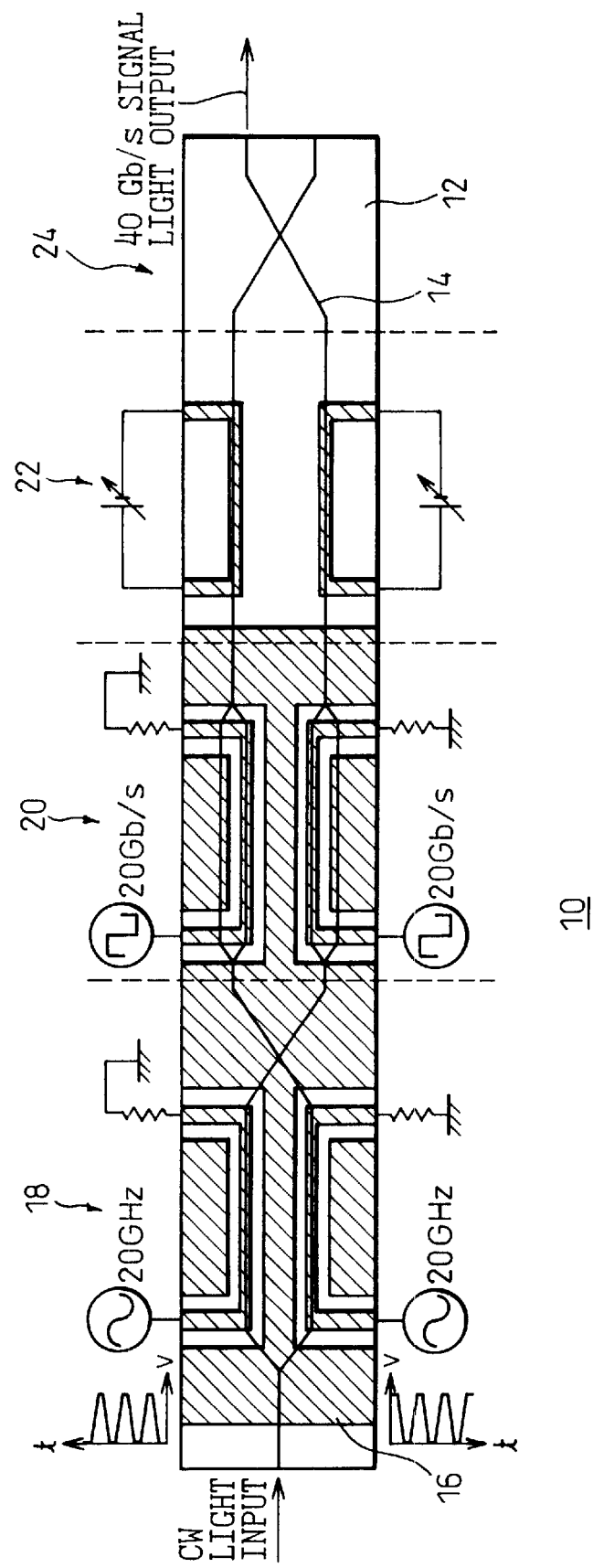
FIG. 4 is a plan view of an optical modulator which generates the 40-Gb/s OTDM signal.
Figure 5:
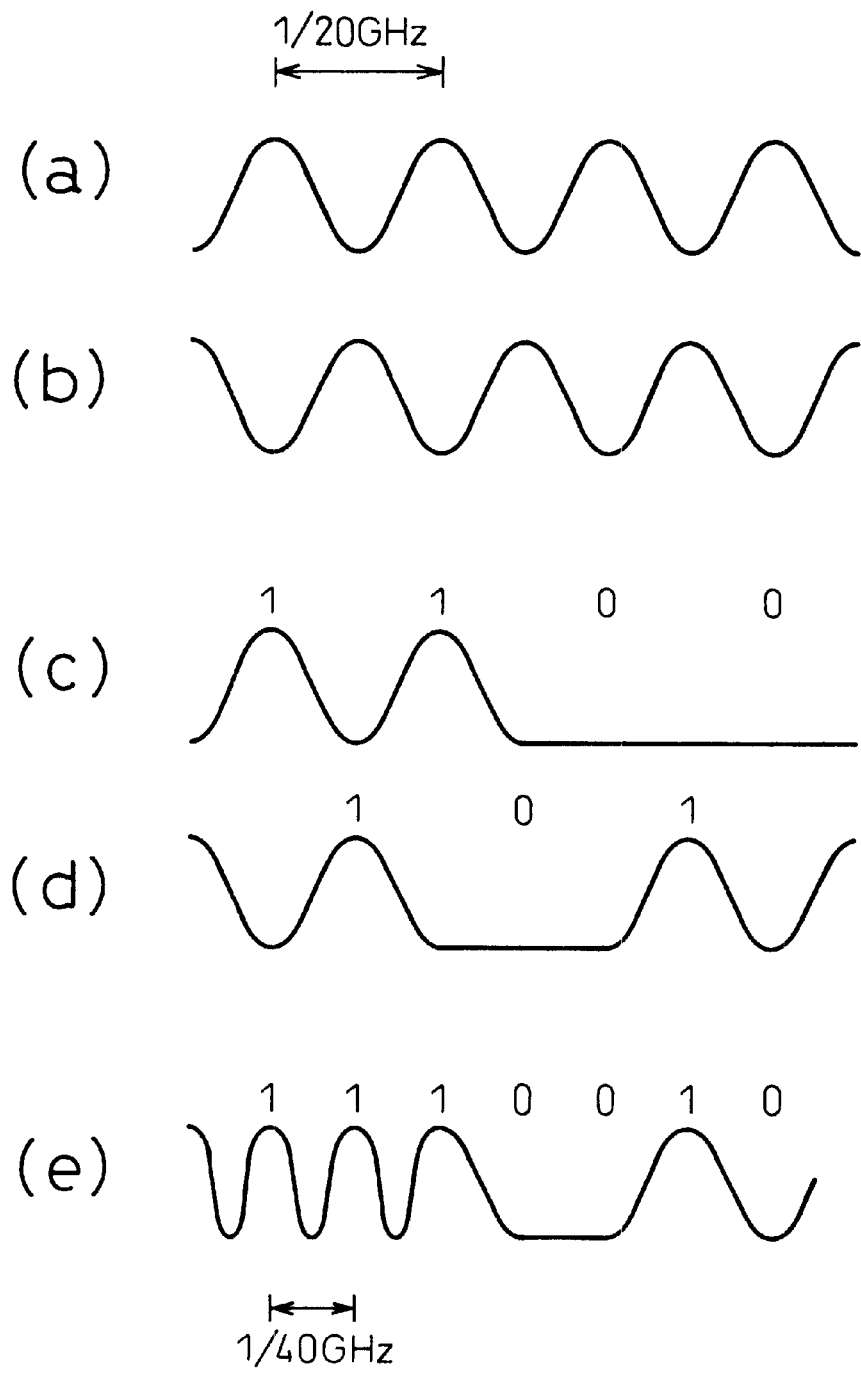
FIGS. 5a, 5b, 5c, 5d and 5e are a waveform diagram for explaining the operation of the optical modulator of FIG. 4.

The OTDM signal here is an optical signal output from an optical modulator 10 such as shown in FIG. 4. In FIG. 4, optical waveguides 14 are formed by thermally diffusing Ti into a $LiNbO_3$ substrate 12, on top of which an electrode pattern 16, shown by hatching in FIG. 4, is formed using Au, thus forming a one-input, two-output optical switch 18, a data modulator section 20 consisting of two independent optical modulators, a phase controller 22, and an optical multiplexer 24. When continuous light is input into the optical waveguides in the one-input, two-output switch 18, and 20-GHz clocks phase-shifted by 180° are applied to the two electrodes, two 20-GHz optical clock signals 180° out of phase relative to each other as shown in parts (a) and (b) in FIG. 5 are output from the optical switch 18 and input into the two optical modulators in the data modulator section 20. A 20-Gb/s data signal is applied to each of the two optical modulators, and the two RZ signals shown in parts (c) and (d) in FIG. 5 are output from the data modulator section 20. The phase controller 22 adjusts the phases of the light waves so that the phase difference between the two light waves becomes 180°, and these light waves are combined in the optical multiplexer 24. Since the phase difference between the two light waves is 180°, in portions where Is appear successively the tails cancel each other so the waveform becomes close to that of an RZ signal, as shown in part (e) of FIG. 5, and in other portions where at least one of adjacent bits is a 0 the waveform becomes close to that of an NRZ signal.

The following can be found from the simulation results of FIGS. 1 to 3.

(a) In OTDM system: The intensity of the 40-GHz component is at a minimum and the eye opening the largest when the amount of total dispersion is 0 ps/nm.

(b) In RZ system (50% duty): Both the intensity of the 40-GHz component and the eye opening are maximum when the amount of total dispersion is zero. This is true of RZ signals of other duty cycles.

(c) In NRZ system: The intensity of the 40-GHz component becomes zero in a cyclic manner against the amount of total dispersion; the minimum point between two largest values of the intensity is at zero total dispersion and, at that point, the eye opening is the largest.

Generally, in fiber-optic transmission, there is a linear relationship between signal wavelength and chromatic dispersion, which means that the same graphs as those shown in FIGS. 1 to 3 can be obtained if signal wavelength is plotted along the abscissa. In that case, the zero total dispersion point is replaced by the zero dispersion wavelength.

It can therefore be seen that in 40-Gb/s transmission (linear transmission), if the intensity of the 40-GHz component is measured by scanning the signal wavelength over a range containing the zero dispersion wavelength, the wavelength at which the total dispersion is zero can be detected using minimum points or maximum points of the 40-GHz component intensity (=monitor signal intensity) in either type of signal modulation format.

Figure 6:
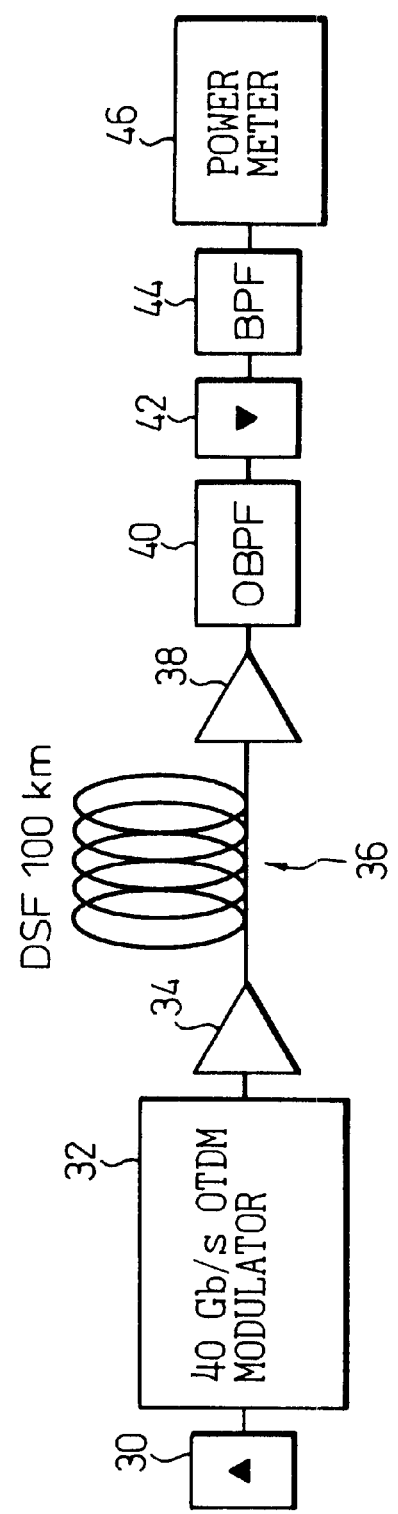
FIG. 6 is a diagram showing an experimental system for measuring the relationship between signal wavelength and 40-GHz component intensity.
Figure 7:
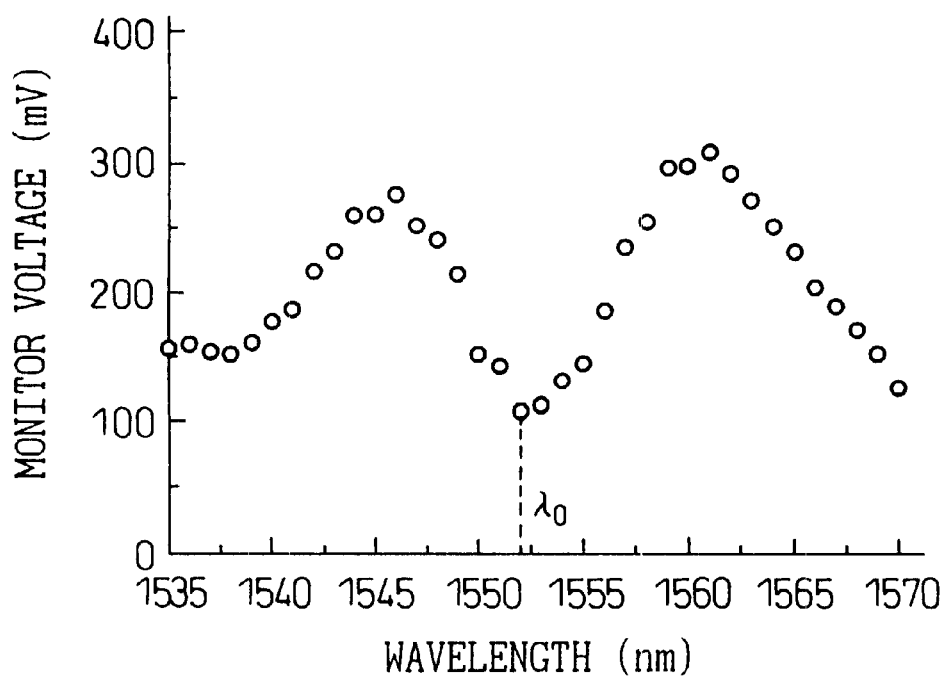
FIG. 7 is a graph plotting the 40-GHz component intensity when the signal wavelength was swept over a range corresponding to that of a scan mode.
Figure 8:
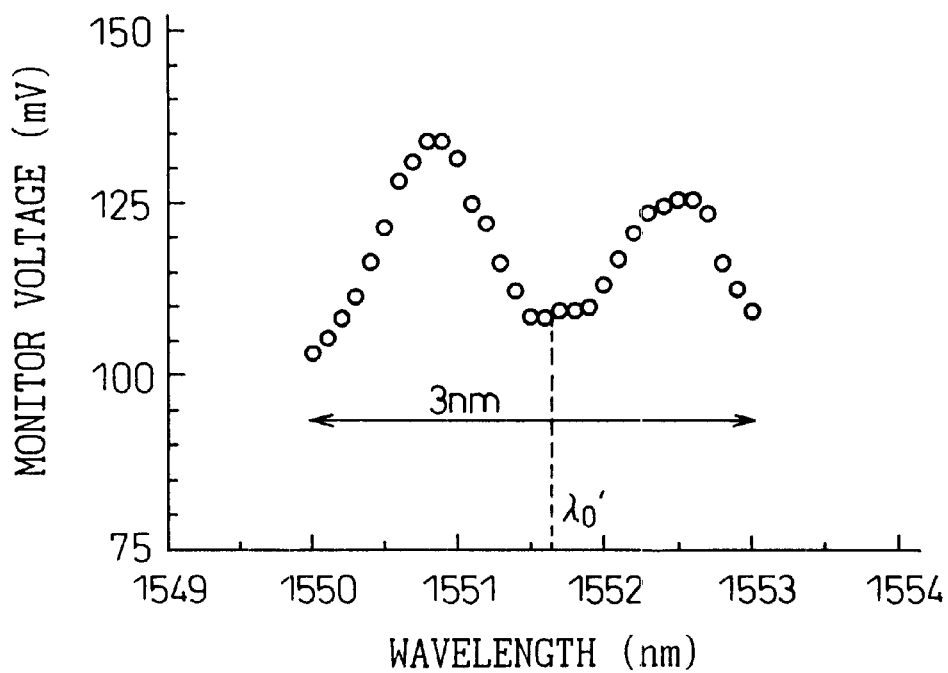
FIG. 8 is a graph plotting the 40-GHz component intensity when the signal wavelength was swept over a range corresponding to that of a tracking mode.

FIGS. 7 and 8 show the intensity of the 40-GHz component as a function of the signal wavelength (experimental results) obtained using the experimental system shown in FIG. 6.

In FIG. 6, output light from a tunable light source 30 (Santec's Tunable LD Light Source TSL-210) is modulated by a 40-GHz OTDM modulator 32, the same one as previously described, and amplified by an optical post-amplifier 34 for transmission through a dispersion-shifted fiber (DSF) 36 of 100 km length. The optical signal transmitted through the DSF 36 is amplified by an optical preamplifier 38, passed through a tunable filter 40 having a passband width of 3 nm, and converted by a photodiode 42 into an electrical signal. The electrical signal is passed through a 40-GHz narrowband filter 44 and input to a power meter 46 for detection of the 40-GHz component intensity.

FIG. 7 shows the result obtained when the signal wavelength was varied from 1535 nm to 1570 nm in steps of 1 nm while varying the center wavelength of the optical filter 40 in synchronized fashion (this operation corresponds to the scan mode described later). FIG. 8 shows the result obtained when only the signal wavelength was varied from 1550 nm to 1553 nm in steps of 0.1 nm while holding the center wavelength of the optical filter 40 fixed at 1551.6 nm (this operation corresponds to the tracking mode described later). The chromatic dispersion value can be reduced to nearly zero by setting the signal wavelength at $\lambda_0$ in the case of FIG. 7 and $\lambda_0'$ in the case of FIG. 8. The two peaks in FIG. 8 are caused by the transmission characteristics of the optical filter 40, and are different in meaning from the two peaks in FIG. 7.

In an actual optical transmission system, since the zero dispersion wavelength of a DSF transmission line varies along the length of fiber, and since the repeater spacing is not exactly the same for each repeater section, the signal wavelength at which the amount of total chromatic dispersion becomes zero differs from one repeater section to another. Accordingly, if the signal wavelength is to be set so that the chromatic dispersion value becomes minimum (zero) for each repeater section at the start of system operation, the minimum value at 1552 nm located between the maximum values at 1546 nm and 1561 nm must be obtained at least once by sweeping the signal light over a wide range, as shown in FIG. 7 (in the present invention, this operation is referred to as the scan mode).

Next, if the signal wavelength is to be controlled so as to keep the chromatic dispersion value minimum against the temporal change of the transmission line dispersion value during system operation, since the wavelength with zero chromatic dispersion does not abruptly depart from the wavelength set in the scan mode, but changes gradually, it is only necessary to sweep the signal wavelength over a relatively narrow range (dithering), as shown in FIG. 8, and tracking the wavelength at which the monitor value becomes minimum (in the present invention, this operation is referred to as the tracking mode).

Figure 9:
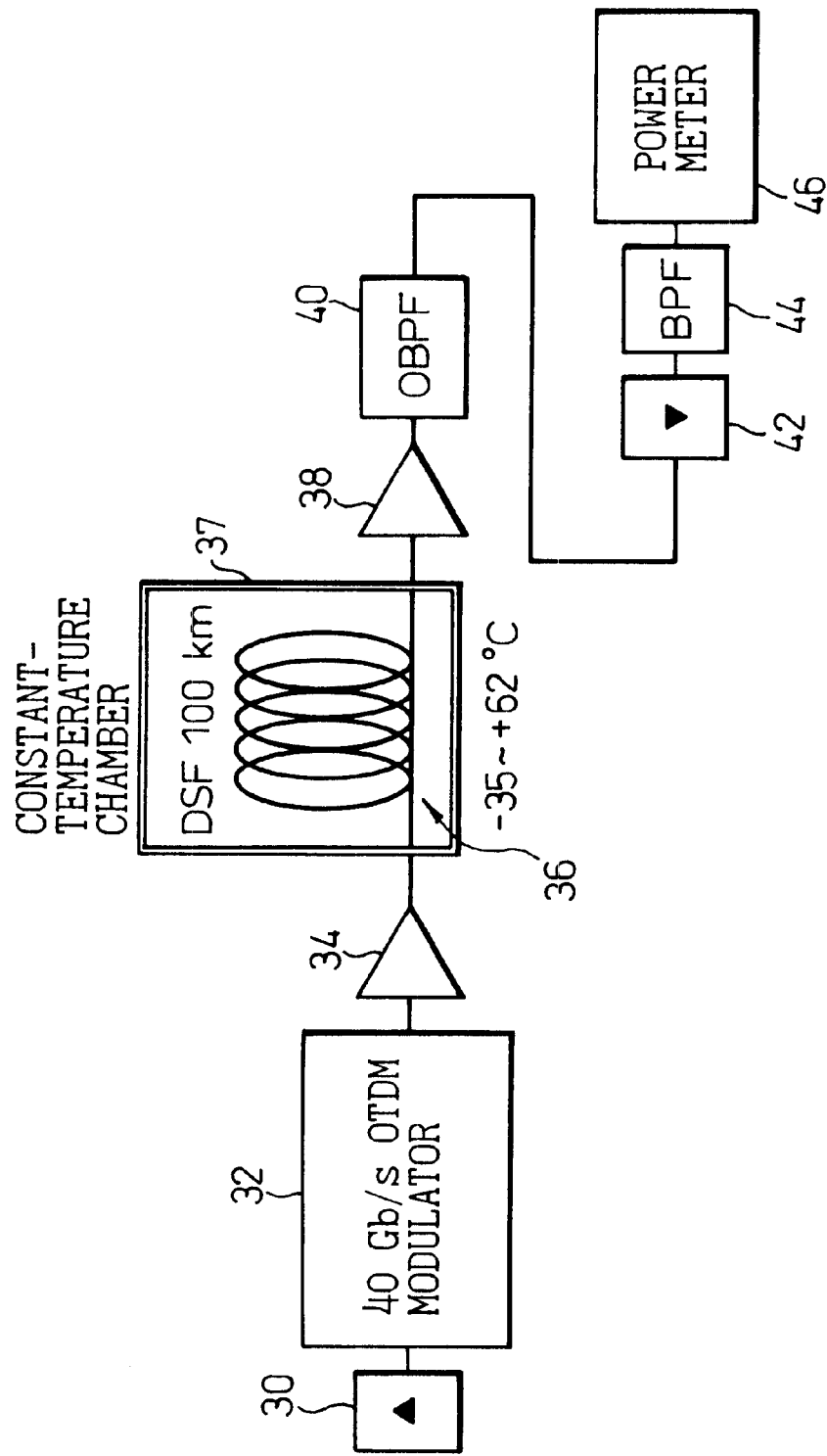
FIG. 9 is a diagram showing an experimental system for measuring the temperature dependence of an optimum wavelength.
Figure 10:
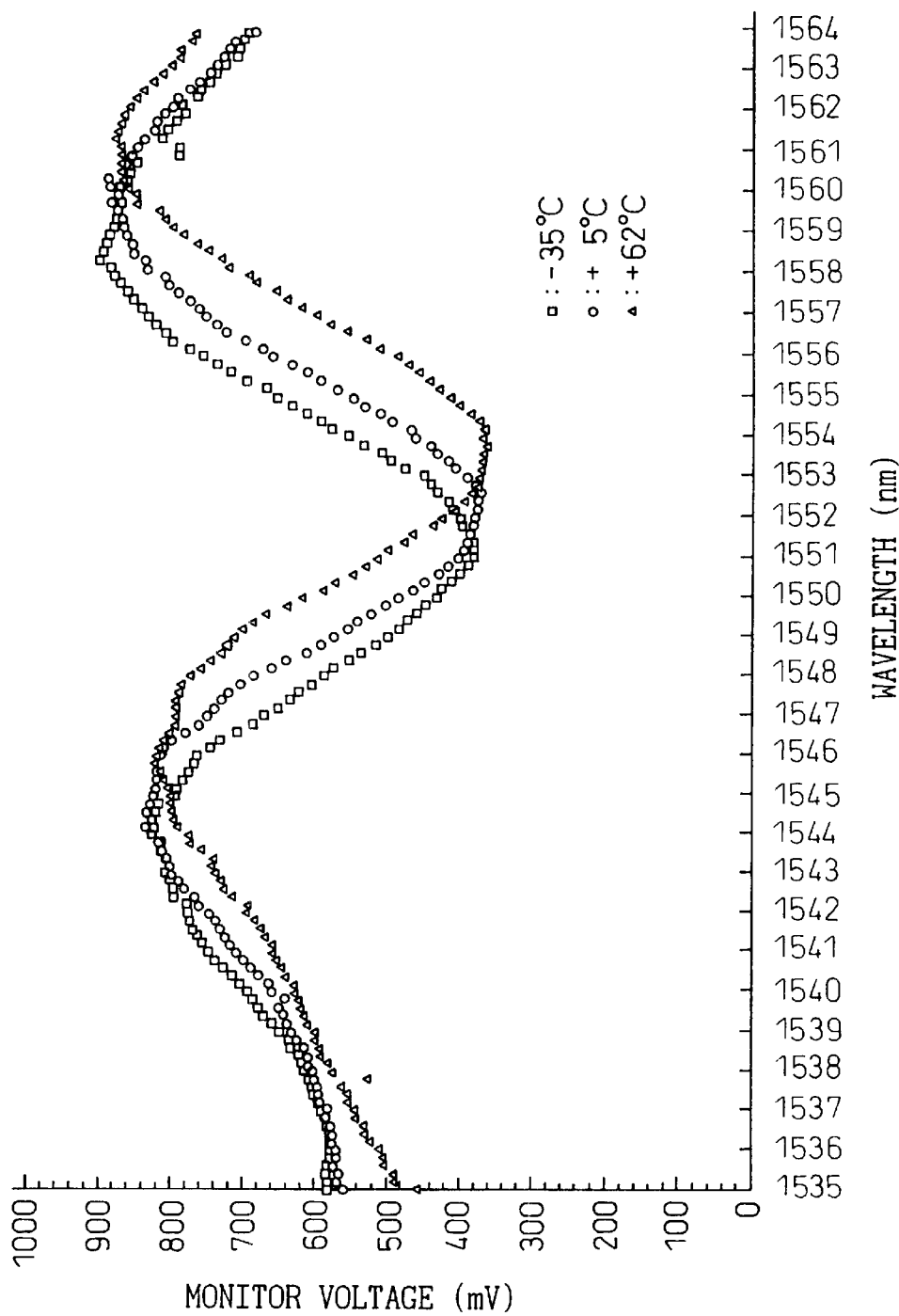
FIG. 10 is a graph showing the results of temperature dependence measurements.

FIG. 10 shows the intensity of the 40-GHz component as a function of the signal light wavelength in a 40-Gb/s OTDM system, measured by placing the DSF 36 in a constant-temperature chamber 37, as shown in FIG. 9, with the temperature set at −35° C., +5° C., and +62° C., respectively. The passband width of the optical filter 40 here is 5 nm. In FIG. 10, it is seen that as the temperature increases, the wavelength corresponding to the minimum value between the two peaks (the wavelength with zero chromatic dispersion) shifts toward the longer wavelength side.

By first performing wavelength optimization in the scan mode at the start of system operation and then tracking the optimum wavelength in the tracking mode during system operation, as described above, the signal light can always be set at the wavelength where the chromatic dispersion is zero.

Figure 11:
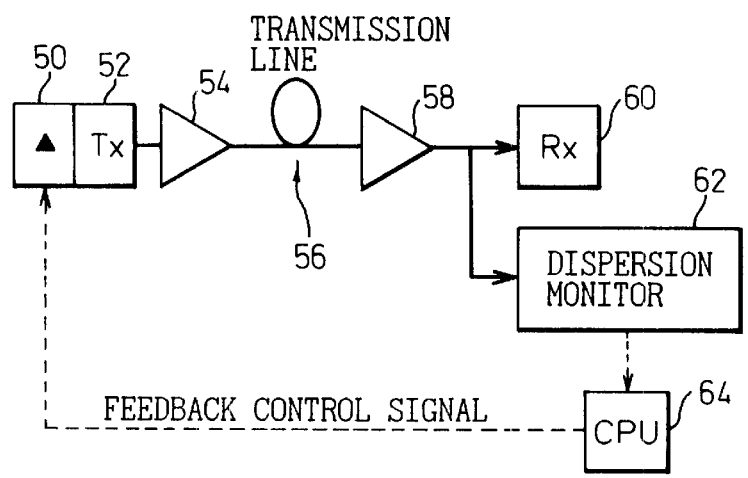
FIG. 11 is a block diagram showing one example of an optical transmission system to which the method of the present invention is applied.
Figure 12:
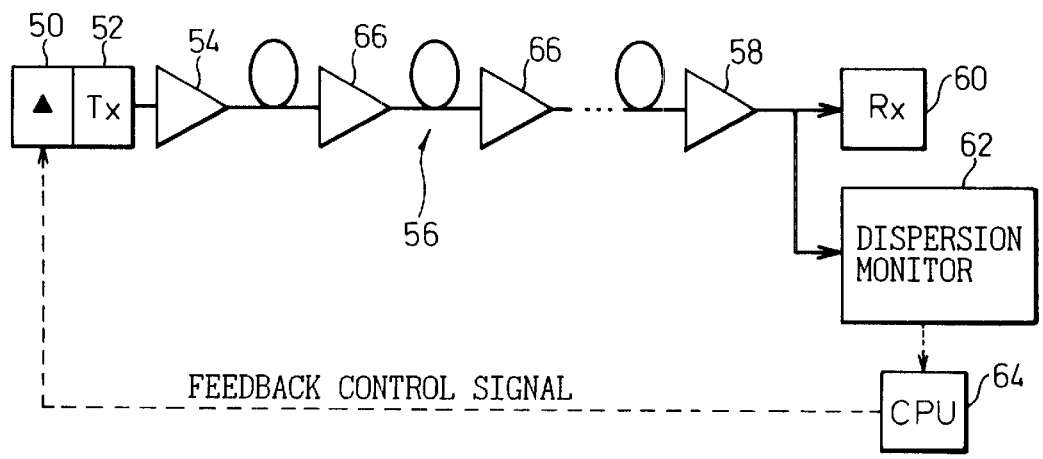
FIG. 12 is a block diagram showing an optical transmission systems in which optical amplifier repeaters are inserted.

FIG. 11 shows one example of an optical transmission system to which the signal wavelength setting method of the present invention is applied. At the transmitting end, an output signal from an optical transmitter 52 having a tunable light source 50 is amplified by an optical post-amplifier 54 before being transmitted over an optical transmission line 56. At the receiving end, the optical signal received from the optical transmission line 56 is first amplified by an optical preamplifier 58 and then input to an optical receiver 60. A portion of the input to the optical receiver 60 is diverted to a dispersion monitor 62 which measures a characteristic value representing the amount of total dispersion of the transmission line 56. The result of the measurement from the dispersion monitor 62 is transferred to a CPU 64. The CPU 64 sweeps the wavelength of the tunable light source over a wide range, for example, from 1535 nm to 1570 nm, before starting system operation, as previously described, and determines the optimum wavelength based on the result of the measurement thus made. Once operation of the system is started, the CPU 64 sweeps the wavelength of the tunable light source over a range, for example, of 0.6 nm width centered about the first determined optimum wavelength, determines the optimum wavelength based on the result of the measurement thus made, and updates the value of the optimum wavelength by the thus determined value. By repeating the above wavelength sweeping, determination, and update process at prescribed intervals of time after operation of the system is started, the signal wavelength can be constantly maintained at the optimum value. FIG. 12 shows an optical amplifier repeater transmission system in which optical repeater amplifiers 66 are inserted in the optical transmission line.

One example of the method of measurement used in the dispersion monitor 62 is to measure the intensity of a particular frequency component (the intensity of the frequency component equivalent to the bit rate) contained in the baseband spectrum of the optical signal transmitted through the fiber, but the method is not limited to this example. It is also possible to use the pulse method or phase method earlier described.

In the example of FIG. 11, the CPU is used to set the signal light at the optimum wavelength. Here, the CPU may be internal to the optical transmitter or optical receiver, or alternatively, an independent computing apparatus such as a personal computer may be used.

Several methods are possible for feedback signal transmission; for example, a method that utilizes a supervisory signal (relatively slow electrical signal) commonly used in an optical transmission system or a method that transmits the feedback signal in an opposite direction can be used (in the latter case, it may become necessary to set the feedback signal light at a wavelength different from the signal wavelength).

Figure 13:
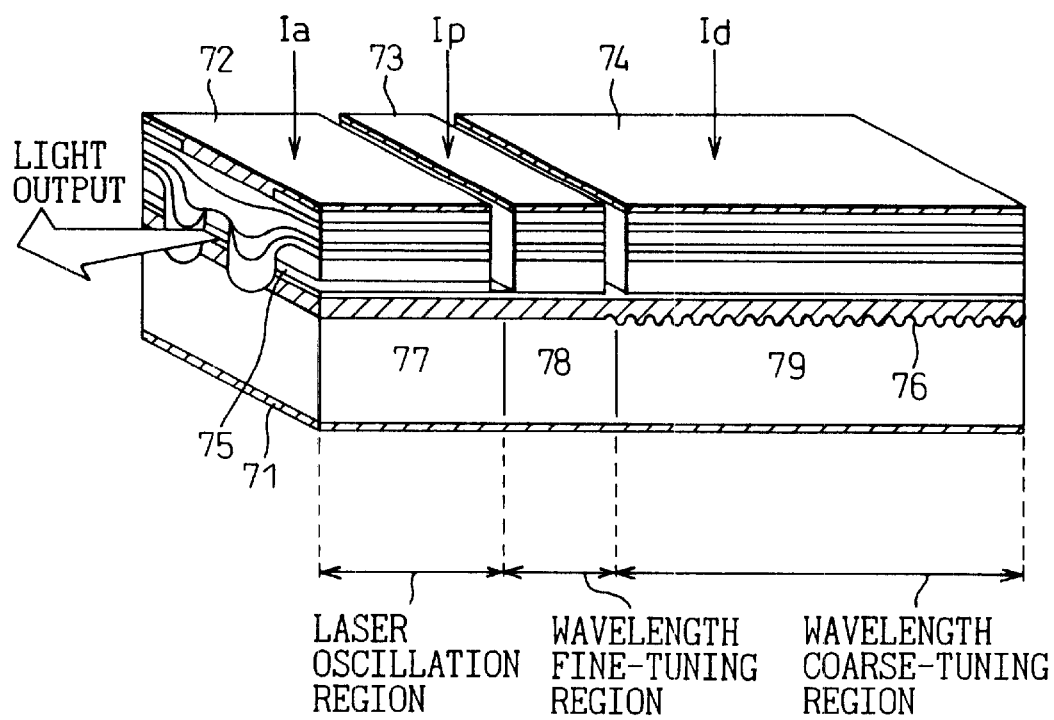
FIG. 13 is a diagram showing a three-electrode type tunable semiconductor laser.

As the tunable light source 50, not only an external-cavity type tunable LD light source, operating on the same principle as the tunable laser diode built in Santec's tunable LD light source unit TSL-210, but a three-electrode type tunable semiconductor laser such as shown in FIG. 13 can also be used. The three-electrode type semiconductor laser shown in FIG. 13 has an InGaAsP/InP laser structure. As shown, a laser oscillation region 77 containing an active layer 75 is formed between a common electrode 71 and an electrode 72, a wavelength fine-tuning region 78 is formed between the common electrode 71 and an electrode 73, and a wavelength coarse-tuning region 79 containing a diffraction grating 76 is formed between the common electrode 71 and an electrode 74. Emission wavelength can be varied by adjusting a current Ip applied to the electrode 73 and a current Id applied to the electrode 74, and the optical output can be controlled by adjusting a current Ia applied to the electrode 72. Therefore, by controlling the currents Ia, Ip, and Id from the CPU 64, an optical signal modulated with the information to be transmitted can be output while controlling the emission wavelength.

Figure 14:
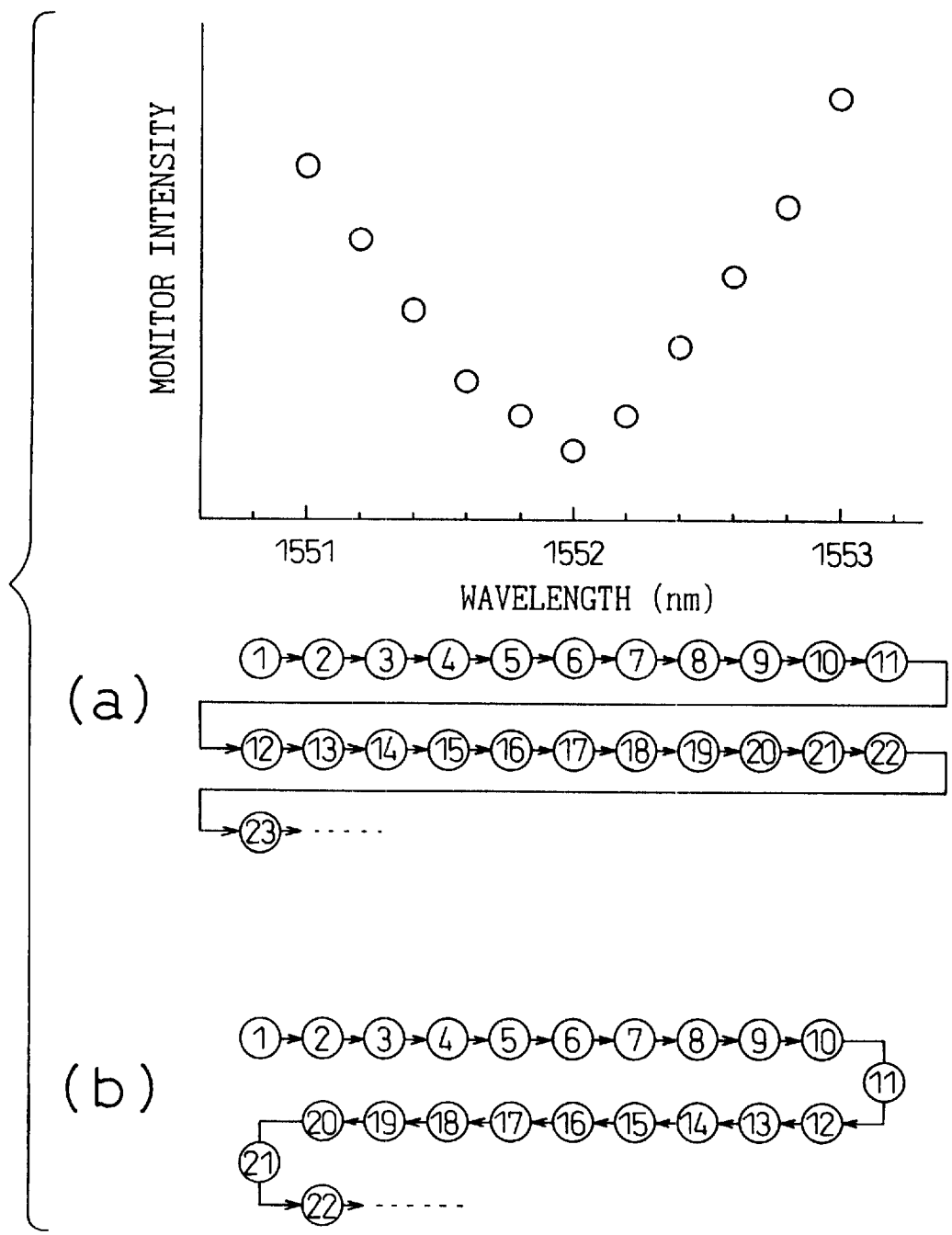
FIG. 14 is a diagram showing examples of methods that can be employed for sweeping the signal wavelength in the tracking mode.

FIG. 14 shows examples of methods that can be employed for sweeping the signal wavelength in the tracking mode. Part (a) shows an example in which the wavelength is swept only in one direction from the shorter wavelength side to the longer wavelength side, i.e., from 1551 nm to 1553 nm in steps of 0.2 nm. It is also possible to sweep the wavelength in the opposite direction, i.e., from the longer wavelength side to the shorter wavelength side. The wavelength sweep range and the sweeping step size are not specifically limited. In this method, however, when flying back from 1553 nm to 1551 nm, the chromatic dispersion may vary greatly, causing a significant change in the received waveform. This can lead to an undesirable situation, for example, causing the PLL to be thrown out of the locked condition, when extracting the timing at the receiving end. It may therefore be preferable to employ a method that sweeps the wavelength between 1551 nm and 1553 nm, changing direction alternately, as shown in part (b).

In the scan mode, two methods are possible; that is, in one method, the wavelength is swept only once in the specified direction (from the shorter wavelength side to the longer wavelength side, or from the longer wavelength side to the shorter wavelength side), and in the other, the wavelength is swept in round trip fashion (from the shorter wavelength side to the longer wavelength side, then back to the shorter wavelength side, or from the longer wavelength side to the shorter wavelength side, then back to the longer wavelength side).

Figure 15:
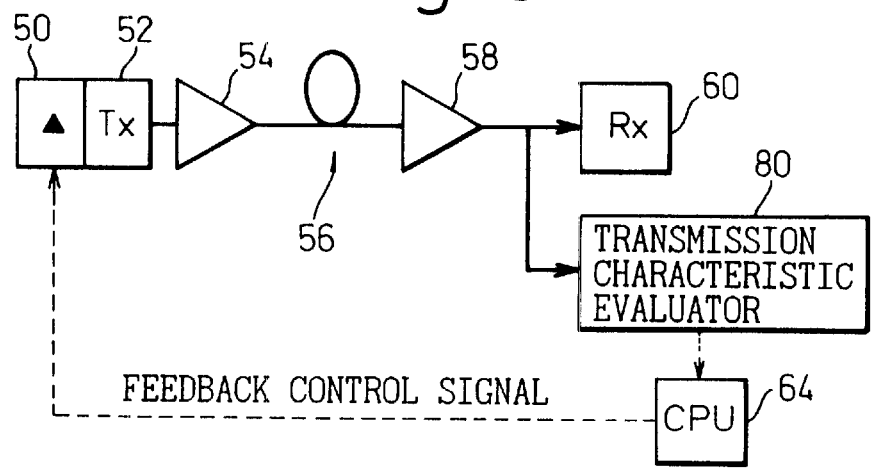
FIG. 15 is a diagram showing a method of setting the wavelength at a point where the best transmission characteristic is achieved.

FIG. 15 is a diagram showing a method in which a characteristic value, such as the bit-error rate or Q value, representing the transmission characteristic, is measured by a transmission characteristic evaluator 80, and the signal light is set at a wavelength where the best characteristic value is obtained, as contrasted with the earlier described method in which a characteristic value representing the amount of total dispersion is measured by the dispersion monitor 62 and the signal light is set at a wavelength where the amount of total dispersion is zero. Another possible method is to observe the received waveform, instead of measuring the bit-error rate or Q value, and to set the wavelength so that the waveform satisfies a predetermined reference eye pattern.

The Q value (=electrical SNR) is defined by the following equation.

$$Q = 20 \log_{10}[(\mu_1 - \mu_0)/(\sigma_1 + \sigma_0)]$$

where $\mu_1$: average level during "emission"

$\mu_0$: average level during "no emission"

$\sigma_1$: standard deviation of level during "emission"

$\sigma_0$: standard deviation of level during "no emission"

Figure 16:
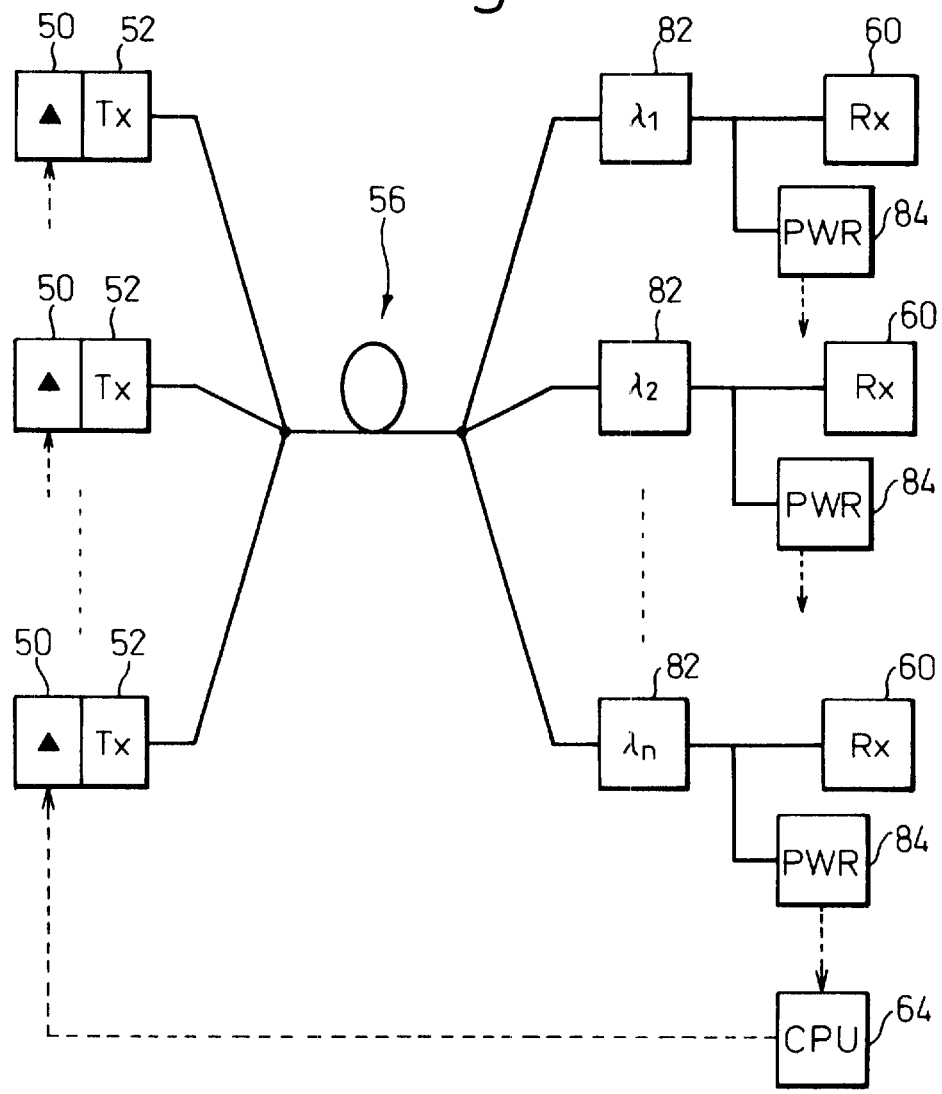
FIG. 16 is a diagram showing an application of the present invention to a wavelength-division multiplexing optical transmission system.

The method of sweeping the wavelength of the tunable laser in the scan mode and the tracking mode can also be applied when setting the signal wavelength at the center of the passband of a fixed (or semi-fixed) optical filter 82 in the wavelength-division multiplexing (WDM) optical transmission system shown in FIG. 16. In this case, first the wavelength is swept in the scan mode, to set the wavelength so that the light power detected by a light power detector 84 following the optical filter becomes maximum. Here, if the center wavelength of the optical filter changes with time, in the tracking mode the signal wavelength can be constantly maintained at the center of the passband of the optical filter. Another possible application of the method is to an optical ADM system that performs channel selection using a tunable filter.

Figure 17:
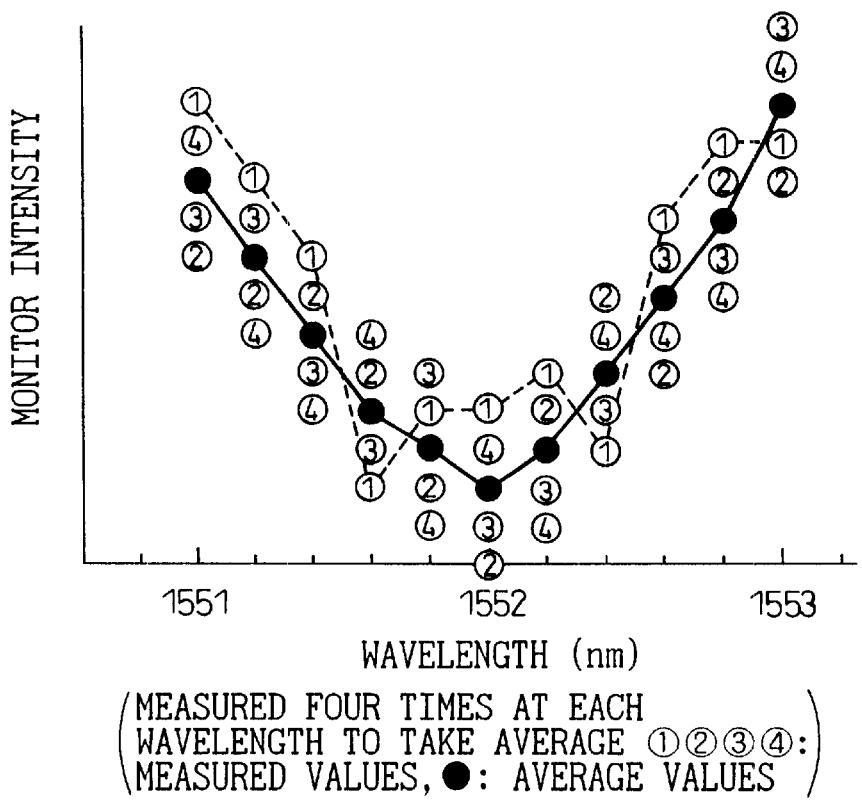
FIG. 17 is a diagram showing a method of determining an optimum wavelength by performing wavelength sweeping a plurality of times and by taking average values.

In FIGS. 11 and 12, when the intensity of the dispersion monitor signal received by the dispersion monitor 62 does not show a clear dependence on wavelength, or when the monitor signal intensity varies with time, or when the reception sensitivity of the monitor signal is low, for example, the variation of data is large and there is the possibility that the wavelength, determined from the obtained data train as the wavelength corresponding to the minimum value, may not represent the average zero dispersion wavelength of the transmission line if the measurement is made only once at each wavelength. An effective method is, therefore, to obtain an average value by making measurements a plurality of times at each wavelength. This method can be applied to both the scan mode and tracking mode. FIG. 17 shows an example in which an average value is obtained by making measurements four times at each wavelength. For example, when the measurement is made only once at each wavelength, the data obtained from such measurements shows that the wavelength at which the monitor intensity is minimum is 1551.6 nm, as shown by the dashed line in FIG. 17; on the other hand, the wavelength determined from the average data shown by the solid line is 1552.0 nm. Two methods are possible here; in one method, measurements are made at each wavelength a plurality of times in succession at predetermined intervals of time, and in the other method, measurements are made once at each wavelength in one sweep pass and the sweeping operation is repeated a plurality of times. The latter method is effective when the wavelength sweeping speed is sufficiently faster than the speed at which the chromatic dispersion value of the transmission line changes with time.

Figure 18:
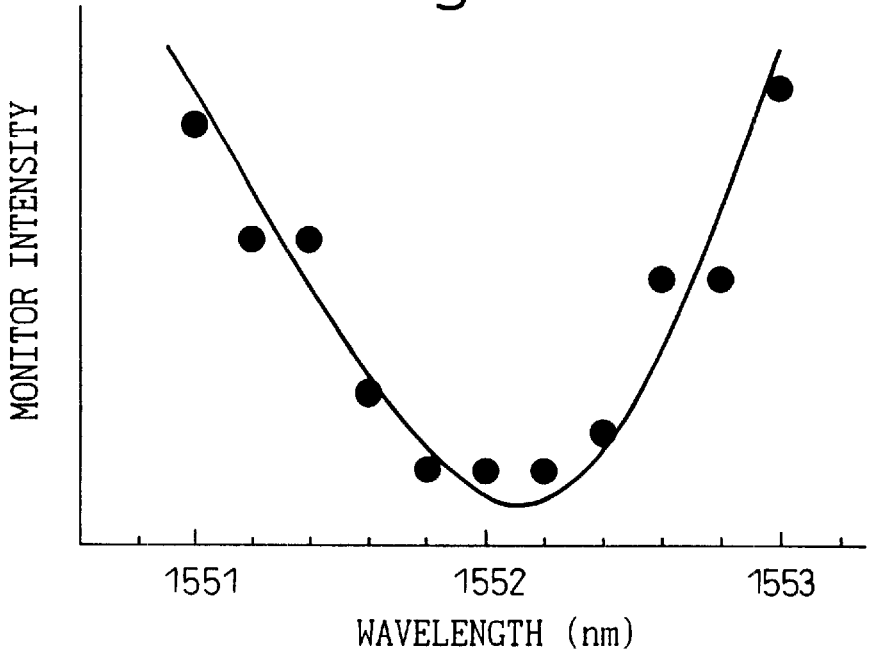
FIG. 18 is a diagram showing a method of determining an optimum wavelength by approximating a function based on the results obtained from one sweeping operation.

An alternative method is to approximate a function by using the data train obtained through one sweep pass and to find the minimum value of the function, as shown in FIG. 18. The approximation of the function is performed by the CPU or a computer.

Examples of the approximation of a function include a polynomial approximation such as $$\sum_{m=0}^{n} a_m X^m = a_0 + a_1 X + a_2 X^2 + a_3 X^3 + \cdots + a_n X^n$$

and a least squares method.

Figure 19:
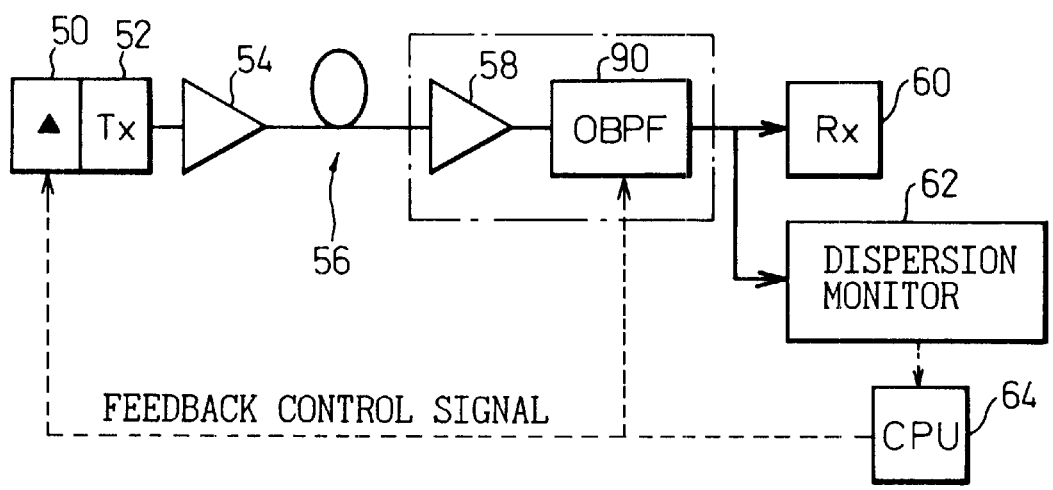
FIG. 19 is a diagram showing how the passband wavelength of an optical filter is swept synchronously with the sweeping of the signal wavelength in a repeaterless transmission system.
Figure 20:
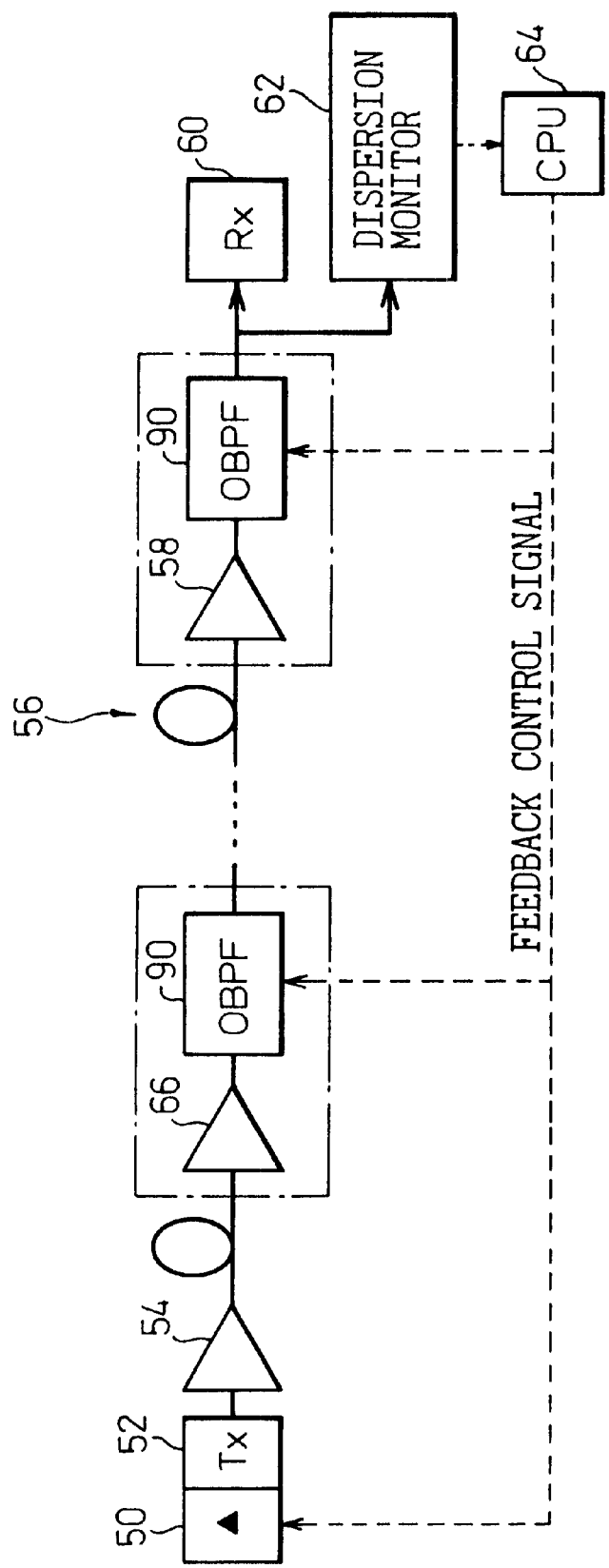
FIG. 20 is a diagram showing how the passband wavelength of an optical filter is swept synchronously with the sweeping of the signal wavelength in an optical amplifier repeater transmission system.

FIGS. 19 and 20 show examples of a system configuration in which feedback control is performed via the CPU 64 to set the signal light at optimum wavelength by monitoring the chromatic dispersion value of the transmission line while sweeping not only the signal wavelength but also the passband center wavelength of a tunable filter 90 installed in the system. FIG. 19 shows a repeaterless transmission system, and FIG. 20 shows an optical amplifier repeater transmission system.

Generally, in an optical transmission system using optical amplifiers, an optical filter for removing the ASE noise generated during optical amplification is provided in order to secure the necessary optical S/N ratio at the receiving end. Further, to improve the minimum reception sensitivity, it will be effective to use a narrowband optical filter having a passband sufficiently narrow just to pass the signal light component. However, if the optical filter is a fixed type, it is not possible to sweep the signal wavelength over a relatively wide range in the scan mode of the present invention. Accordingly, every narrowband optical filter installed in the system must be constructed from a tunable filter so that its passband can be varied synchronously with the signal wavelength.

FIGS. 19 and 20 each illustrates an example of a signal light wavelength optimization system using a dispersion monitor; in either example, the utilization of tunable filters is also effective in securing the S/N ratio necessary for the detection of the dispersion monitor signal intensity. In the case of the optical amplifier repeater transmission system shown in FIG. 20, it is possible to dispose a narrowband tunable filter for only the optical amplifier 58, while disposing, for the in-line optical amplifier 66, a relatively wideband, fixed-type optical filter that allows the range of wavelengths in the scan mode to pass through it.

Figure 21:
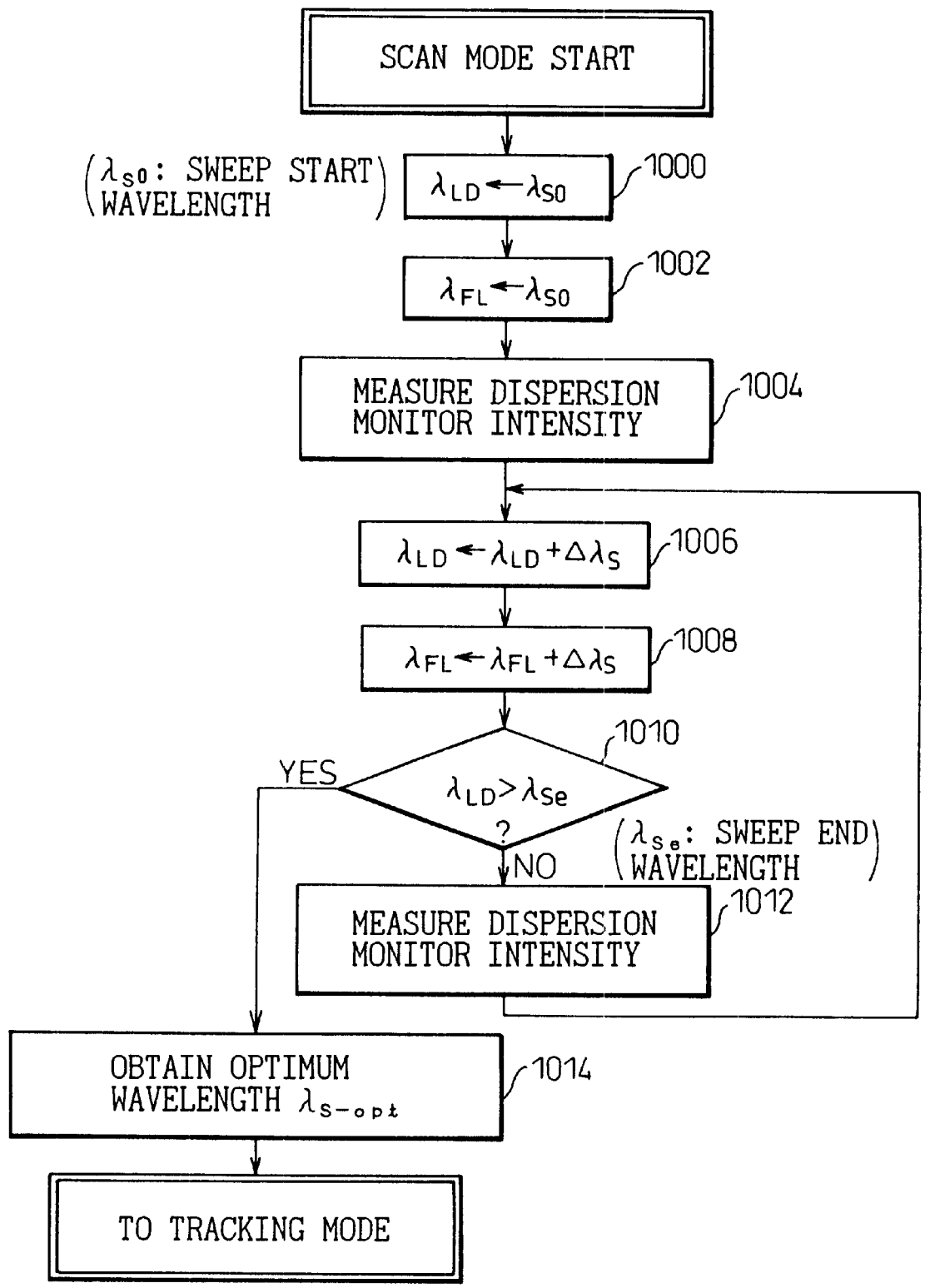
FIG. 21 is a flowchart for the scan mode.

FIG. 21 is a flowchart illustrating the operation of the CPU 64 in the scan mode. In FIG. 21, first the wavelength $\lambda_{LD}$ Of the tunable light source 50 and the center wavelength $\lambda_{FL}$ of the optical filter 90 are set at the sweep start wavelength $\lambda_{S0}$ (steps 1000 and 1002), and in this condition, the intensity of the dispersion monitor is measured (step 1004). Next, $\lambda_{LD}$ and $\lambda_{FL}$ are increased by $\Delta\lambda_S$ (steps 1006 and 1008), and if the wavelength $\lambda_{LD}$ does not exceed the sweep end wavelength $\lambda_{Se}$ (step 1010), the intensity of the dispersion monitor is measured (step 1012), and the process returns to step 1006. If, in step 1010, the wavelength $\lambda_{LD}$ exceeds the sweep end wavelength $\lambda_{Se}$, an optimum wavelength $\lambda_{S-opt}$ is obtained in accordance with the algorithm described later (step 1014), and the mode is switched to the tracking mode. In steps 1004 and 1012, provisions may be made to obtain an average value by measuring the dispersion monitor intensity a plurality of times.

Figure 22:
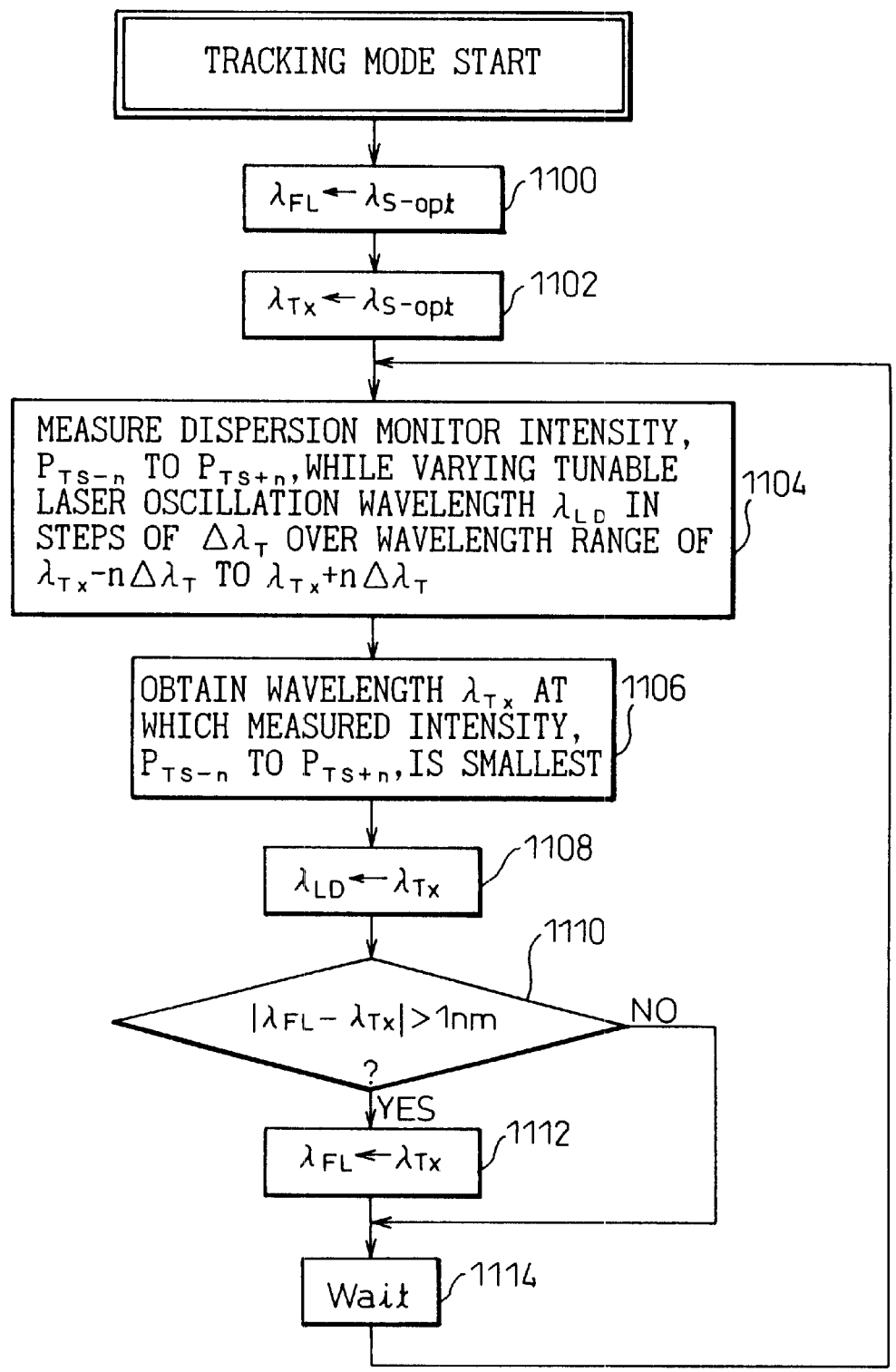
FIG. 22 is a flowchart for the tracking mode.

FIG. 22 is a flowchart illustrating the operation of the CPU 64 in the tracking mode. The center wavelength $\lambda_{FL}$ of the optical filter is set at the optimum wavelength $\lambda_{S-opt}$ obtained in the scan mode (step 1100), and the optimum wavelength $\lambda_{S-opt}$ is substituted for a wavelength parameter $\lambda_{TX}$ (step 1102).

In step 1104, the dispersion monitor intensity, $P_{TS-n}$ to $P_{TS+n}$, is measured by varying the wavelength $\lambda_{LD}$ of the tunable light source (laser) 50 in steps of wavelength $\Delta\lambda_T$ over the range of $\lambda_{TX}-n\Delta\lambda_T$ to $\lambda_{TX}+n\Delta\lambda_T$ while holding the center wavelength $\lambda_{FL}$ of the optical filter fixed. Next, the wavelength $\lambda_{TX}$ at which the measured intensity, $P_{TS\_n}$ to $P_{TS+n}$, is the smallest is determined (step 1106), and the thus determined wavelength $\lambda_{TX}$ is set as the wavelength $\lambda_{LD}$ Of the tunable light source 50 (step 1108). Then, it is determined whether the difference between $\lambda_{FL}$ and $\lambda_{TX}$ is greater than 1 nm (step 1110); if the difference is greater than 1 nm, the center wavelength $\lambda_{FL}$ Of the optical filter 90 is also set at $\lambda_{TX}$ (step 1112). After waiting until the next cycle of tracking operation comes (step 1114), the process returns to step 1104. If the tracking operation is to be performed successively, the process immediately returns to step 1104 without waiting.

As can be seen from the above flow, since the tunable filter has a range of passband, its center wavelength need not be swept like the wavelength of the tunable laser. If the passband width of the tunable filter is sufficiently larger than the sweeping range of the tunable laser, the passband of the tunable filter can be held fixed during one sweeping operation. If the optimum wavelength shifts by more than a certain amount (in the above flowchart, more than 1 nm), then the center wavelength of the tunable filter should also be shifted accordingly. This amount of optimum wavelength shift is dependent on the passband width of the tunable filter. The wavelength sweeping can be accomplished by a unidirectional sweeping method or a bidirectional sweeping method, but the description of the method is omitted in the above flowchart. Also, the process for making measurements a plurality of times at each wavelength is not described in the flowchart.

Figure 23:
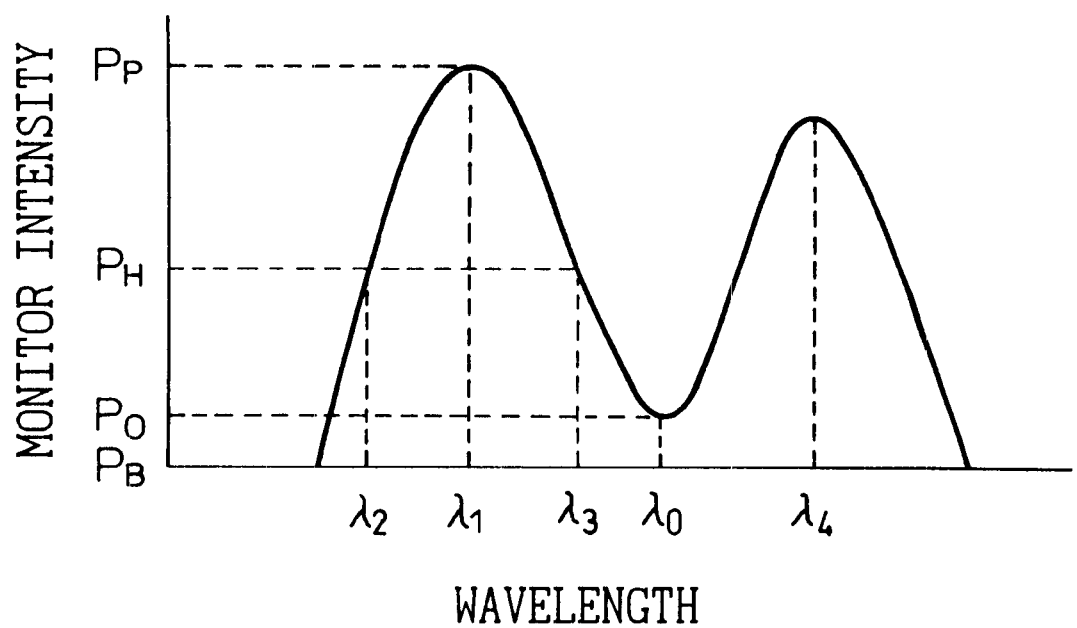
FIG. 23 is a diagram showing a method of determining an optimum value by computer in the scan mode.

Referring now to FIG. 23, a procedure for determining the optimum wavelength by computer will be described below. The procedure assumes the relationship between the chromatic dispersion (or signal wavelength) and the 40-GHz component intensity in the 40-Gb/s OTDM system shown in FIGS. 1 and 4 to 10, and the thick solid curve in the figure represents the result of the approximation of a function with the monitor intensities obtained in the scan mode.

(i) Monitor intensity maximum value $P_P$ and corresponding wavelength $\lambda_1$ are obtained.

(ii) Monitor intensity minimum value $P_B$ is obtained.

(iii) Wavelength $\lambda_2$ and $\lambda_3$ are obtained that correspond to the monitor intensity=$(P_P-P_B)/2$ and that are closest to $\lambda_1$ on the shorter wavelength and longer wavelength sides, respectively.

(iv) Maximum values are obtained on the shorter wavelength side of $\lambda_2$ and on the longer wavelength side of $\lambda_3$, respectively, and wavelength $\lambda_4$ corresponding to the greater of the two values (the second highest peak value) is obtained.

(v) Minimum value between $\lambda_1$ and $\lambda_4$ is obtained. Wavelength $\lambda_0$ is the wavelength at which the chromatic dispersion value is minimum (zero).

Figure 24:
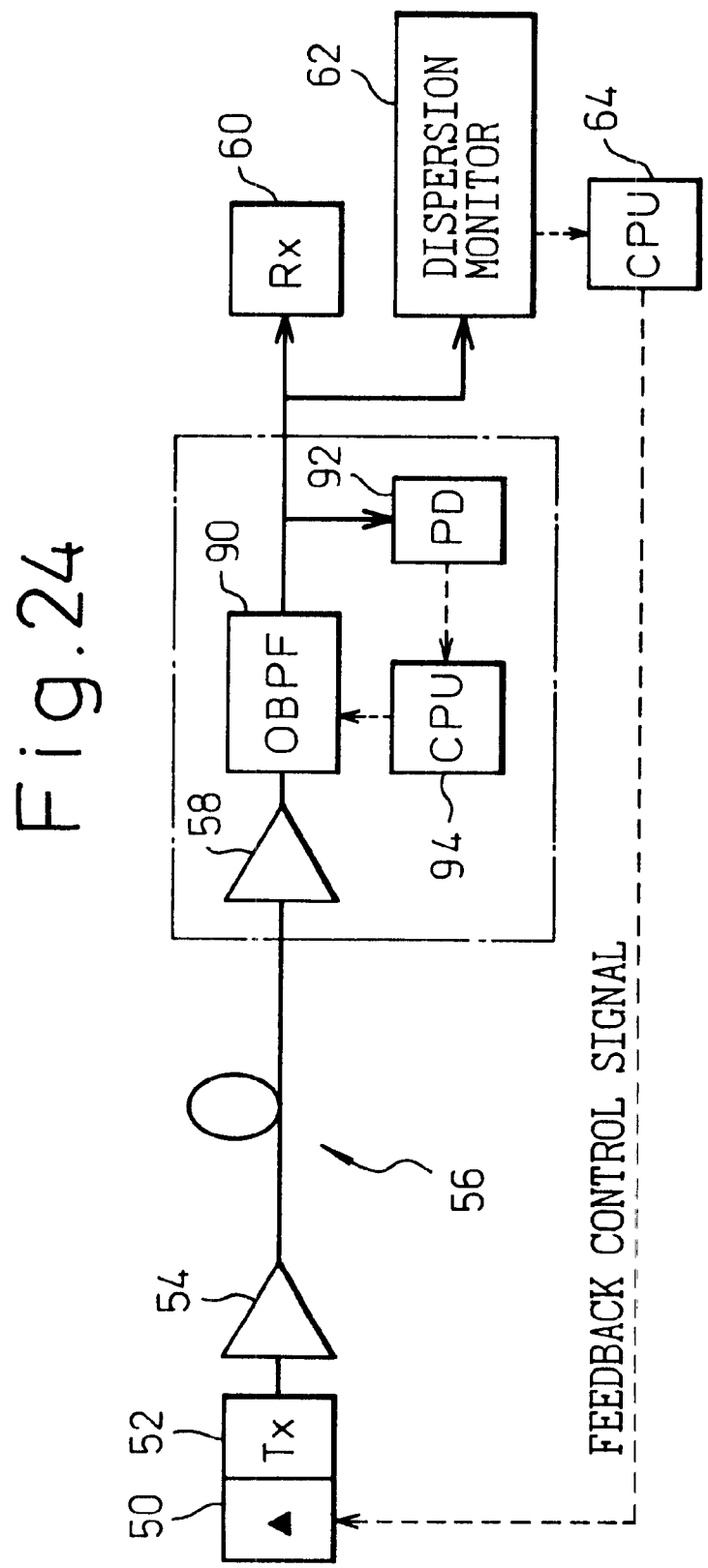
FIG. 24 is a diagram showing one modified example of the system of FIG. 19.

FIG. 24 shows a modified example of the system of FIG. 19. In the system of FIG. 19, the passband wavelength or the passband center wavelength (hereinafter referred to as the passband wavelength) of the tunable filter 90 is controlled synchronously with the control of the tunable light source 50. By contrast, in the system of FIG. 24, the passband wavelength is controlled by a CPU 94, independently of the control of the signal wavelength. More specifically, a portion of the output light from the tunable filter 90 is diverted to a photodiode 92 for detection of the signal power and, based on the result of the detection, the CPU 94 controls the passband wavelength of the tunable filter 90 in such a manner as to maximize the signal power. The control of the passband wavelength is accomplished, for example, by a technique in which the passband wavelength is brought closer to the optimum value based on the variation of the signal power when the passband wavelength is slightly varied around the present value. Controlling the passband wavelength so as to maximize the power of the output light of the tunable filter 90 results in controlling the passband wavelength of the tunable filter 90 in such a manner as to respond to the control of the tunable light source 50.

Figure 25:
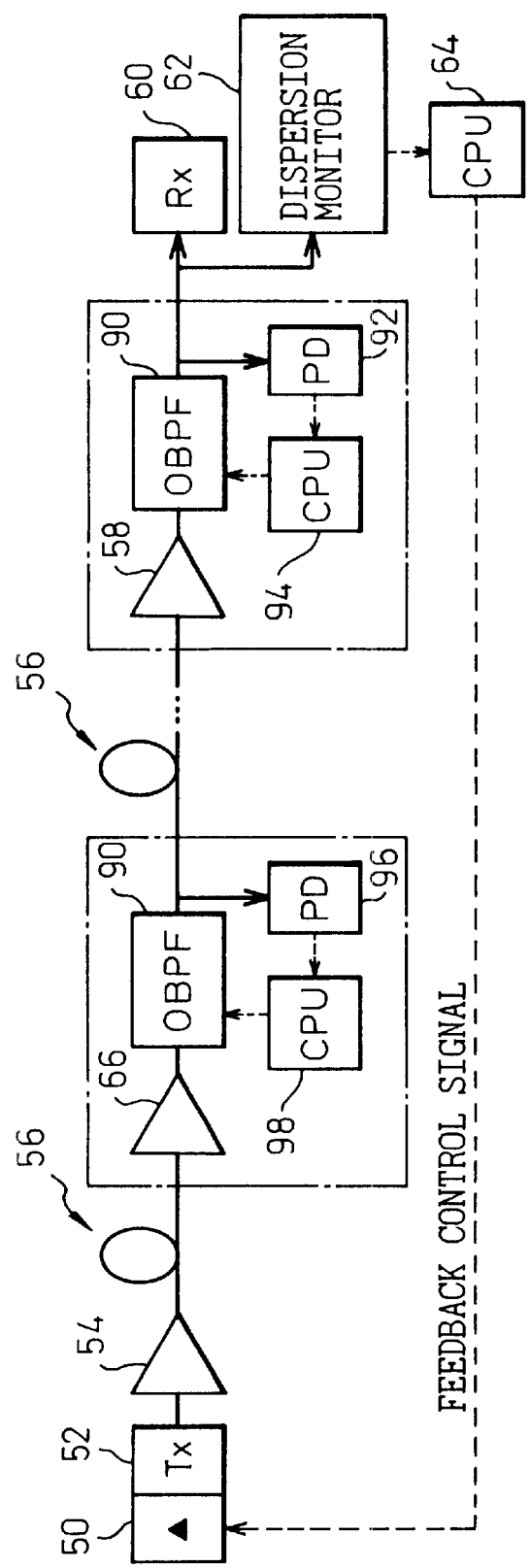
FIG. 25 is a diagram showing one modified example of the system of FIG. 20.

FIG. 25 shows the case of the optical amplifier repeater transmission system. In FIG. 25, the power of the output light from the tunable filter 90 in the optical amplifier repeater 66 is detected by a photodiode 96, and the passband wavelength of the tunable filter 90 is controlled based on the result of the detection. Accordingly, the passband wavelength of the tunable filter 90 in the optical amplifier repeater 66 is controlled in such a manner as to respond to the control of the tunable light source 50.

Figure 26:
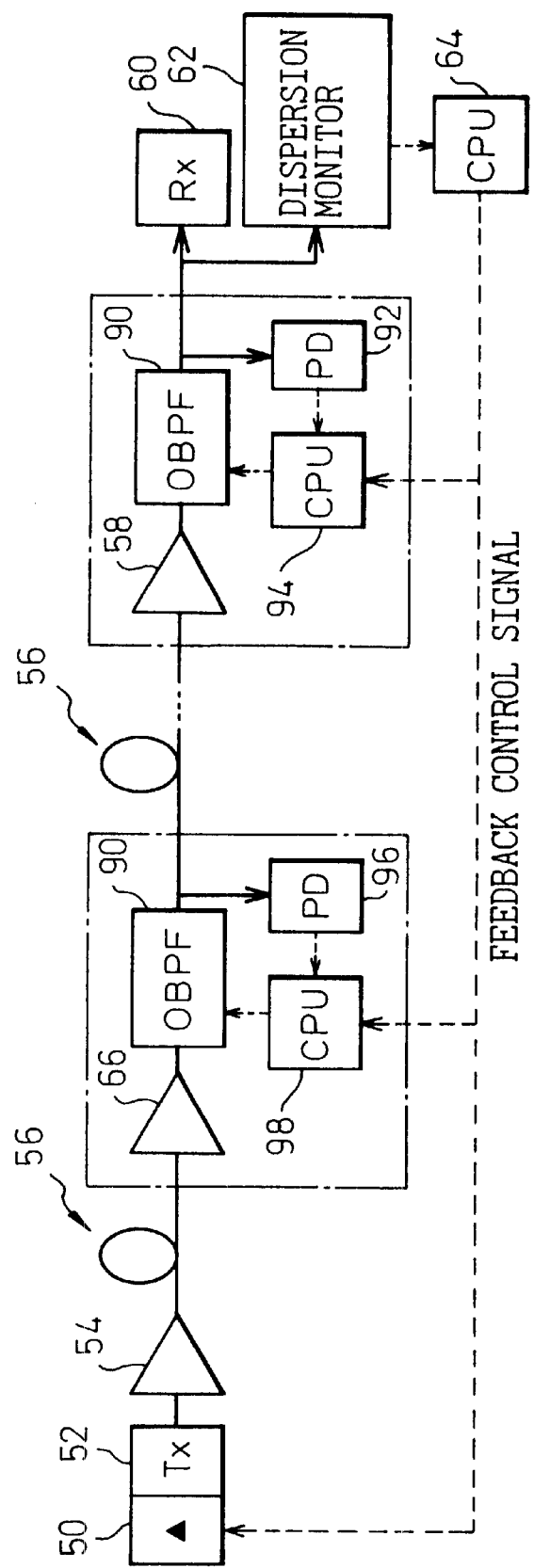
FIG. 26 is a diagram showing a modification of the system of FIG. 25.

Since the speed at which the signal wavelength is varied differs between the scan mode and the tracking mode, better control can be achieved if the passband wavelength of the tunable filter 90 is controlled at a speed appropriate to the speed at which the signal wavelength is varied. In the system shown in FIG. 26, CPUs 94 and 98 responsible for controlling the respective tunable filters 90 receive information concerning the wavelength varying speed from the CPU 64 responsible for controlling the tunable light source 50, and control the passband wavelengths of the respective filters at a speed appropriate to the speed at which the signal wavelength is varied.

What is claimed is:

1. A method of setting signal wavelength in an optical transmission system, comprising the steps of:

sweeping said signal wavelength over a first wavelength range before operation of said optical transmission system is started;

determining an optimum value for said wavelength based on the result of the sweeping over said first wavelength range;

after operation of said optical transmission system is started, sweeping said wavelength over a second wavelength range which is centered about said optimum value and is narrower than said first wavelength range; and updating said optimum value for said wavelength based on the result of the sweeping over said second wavelength range.

2. A method according to claim 1, wherein the sweeping over said first wavelength range and the sweeping over said second wavelength range are both performed a plurality of times, each time in the same direction.

3. A method according to claim 1, wherein the sweeping over said first wavelength range is performed a plurality of times, each time in the same direction, and the sweeping over said second wavelength range is performed a plurality of time in opposite directions, each time changing direction.

4. A method according to claim 1, wherein the wavelength at which the amount of total dispersion in a transmission line is zero is defined as said optimum value for said signal wavelength.

5. A method according to claim 4, wherein the wavelength at which the intensity of a particular frequency component in a baseband spectrum of an optical signal, after being transmitted over said transmission line, reaches a maximum or reaches a minimum between two peaks is defined as the wavelength at which the amount of total dispersion in said transmission line is zero.

6. A method according to claim 5, wherein said particular frequency is equal in value to the bit rate of said transmitted signal.

7. A method according to claim 1, wherein the wavelength at which the quality of a transmitted signal is maximized is defined as said optimum value for said signal wavelength.

8. A method according to claim 1, wherein the wavelength at which the intensity of signal light passed through a filter provided at receiving end is maximum is defined as said optimum value for said signal wavelength.

9. A method according to claim 1, wherein the sweeping over said first wavelength range and the sweeping over said second wavelength range are each performed a plurality of times to obtain an average value based on which said optimum value for said signal wavelength is determined.

10. A method according to claim 1, wherein said optimum value for said signal wavelength is determined by approximating a function based on results obtained from the sweeping over said first wavelength range and the sweeping over said second wavelength range.

11. A method according to claim 10, wherein said optical transmission system includes an optical filter inserted at an intermediate point along a transmission line and an optical filter inserted at receiving end, and the passband wavelength only of the optical filter inserted at the receiving end is swept synchronously with the sweeping of said signal wavelength.

12. A method according to claim 11, wherein the passband wavelength of said optical filter is varied only when said optimum value determined for said signal wavelength has changed by more than a predetermined value during the sweeping over said second wavelength range.

13. A method according to claim 1, wherein the passband wavelength of an optical filter inserted in said optical transmission system is also swept synchronously with the sweeping of said signal wavelength.

14. A method according to claim 13, wherein the passband wavelength of said optical filter is varied only when said optimum value determined for said signal wavelength has changed by more than a predetermined value during the sweeping over said second wavelength range.

15. A method according to claim 1, wherein the passband wavelength of an optical filter inserted in said optical transmission system is controlled in such a manner as to maximize the power of light transmitted through said filter.

16. A method according to claim 15, wherein said optical filter includes an optical filter inserted at an intermediate point along a transmission line as well as an optical filter inserted at receiving end.

17. A method according to claim 16, wherein said passband wavelength is controlled at a speed appropriate to the speed at which said signal wavelength is varied.

18. A method according to claim 15, wherein said passband wavelength is controlled at a speed appropriate to the speed at which said signal wavelength is varied.

* * * * *